(12) United States Patent
Park

(10) Patent No.: US 12,246,714 B2
(45) Date of Patent: Mar. 11, 2025

(54) ADVANCED DRIVER ASSISTANCE SYSTEM, AND VEHICLE HAVING THE SAME

(71) Applicant: HL KLEMOVE CORP., Incheon (KR)

(72) Inventor: Hyunsoo Park, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 387 days.

(21) Appl. No.: 17/718,717

(22) Filed: Apr. 12, 2022

(65) Prior Publication Data

US 2022/0332319 A1    Oct. 20, 2022

(30) Foreign Application Priority Data

Apr. 16, 2021    (KR) .................. 10-2021-0049691

(51) Int. Cl.
*B60W 30/16*    (2020.01)
*B60Q 1/34*    (2006.01)
(Continued)

(52) U.S. Cl.
CPC ............. *B60W 30/16* (2013.01); *B60Q 1/343* (2013.01); *B60W 30/143* (2013.01);
(Continued)

(58) Field of Classification Search
CPC ............ B60Q 1/343; B60W 2050/143; B60W 2050/146; B60W 2510/182; B60W 2520/14; B60W 2554/4041; B60W 2554/4042; B60W 2554/4045; B60W 2554/80; B60W 2554/802; B60W 2556/65; B60W 2720/106; B60W 30/143;
(Continued)

(56) References Cited

U.S. PATENT DOCUMENTS 11,718,289 B2 *   8/2023   Cheon ................ B60R 21/0134
                                              701/301
2007/0168113 A1 *  7/2007   Litkouhi ............... G01C 21/26
                                              701/532
(Continued)

FOREIGN PATENT DOCUMENTS

CN    107979812 A  *  5/2018  ............. B60Q 9/008
CN    113147748 A  *  7/2021
(Continued)

*Primary Examiner* — Babar Sarwar
(74) *Attorney, Agent, or Firm* — Hauptman Ham, LLP

(57) ABSTRACT

Provided is an advanced driver assist system (ADAS) and a vehicle having the same. The ADAS includes: a communicator configured to communicate with a plurality of other vehicles; an obstacle detector configured to detect an obstacle in a surrounding and output obstacle information about the detected obstacle; and a controller configured to acquire distance information about a distance to a second vehicle travelling in the surrounding of the first vehicle among the obstacles based on the obstacle information detected by the obstacle detector during a cruise control mode, acquire travel information and position information of a third vehicle travelling in the surrounding of the second vehicle based on information received through the communicator, and controlling acceleration and deceleration based on the distance information with respect to the second vehicle, the travel information of the third vehicle, and the position information of the third vehicle.

18 Claims, 11 Drawing Sheets

(51) Int. Cl.
  *B60W 30/14* (2006.01)
  *B60W 40/105* (2012.01)
  *B60W 50/14* (2020.01)
  *H04W 4/46* (2018.01)

(52) U.S. Cl.
  CPC .......... *B60W 40/105* (2013.01); *B60W 50/14* (2013.01); *H04W 4/46* (2018.02); *B60W 2050/143* (2013.01); *B60W 2050/146* (2013.01); *B60W 2510/182* (2013.01); *B60W 2520/14* (2013.01); *B60W 2554/4041* (2020.02); *B60W 2554/80* (2020.02); *B60W 2556/65* (2020.02)

(58) Field of Classification Search
  CPC .... B60W 30/16; B60W 40/105; B60W 50/14; G01S 13/931; G01S 17/931; G01S 2013/93185; G01S 2013/9319; G01S 2013/9323; G08G 1/164; G08G 1/165; G08G 1/166; H04W 4/029; H04W 4/46
  See application file for complete search history.

(56) References Cited

U.S. PATENT DOCUMENTS

| | | | | |
|---|---|---|---|---|
| 2009/0118994 | A1* | 5/2009 | Mori | G08G 1/167 701/117 |
| 2009/0167560 | A1* | 7/2009 | Becker | B60W 40/072 348/149 |
| 2010/0198513 | A1* | 8/2010 | Zeng | G01S 13/931 701/300 |
| 2013/0015984 | A1* | 1/2013 | Yamashiro | G08G 1/22 340/988 |
| 2015/0260530 | A1* | 9/2015 | Stenborg | G01C 21/3602 701/461 |
| 2016/0321924 | A1* | 11/2016 | Lewis | B60W 40/109 |
| 2018/0170327 | A1* | 6/2018 | Lee | B60T 7/22 |
| 2020/0047746 | A1* | 2/2020 | Ji | B60W 10/18 |
| 2020/0145191 | A1* | 5/2020 | Qi | H04L 9/3239 |
| 2020/0148214 | A1* | 5/2020 | Tamagaki | B60R 21/00 |
| 2020/0242922 | A1* | 7/2020 | Dulberg | G08G 1/166 |
| 2020/0302780 | A1* | 9/2020 | Awai | B60W 60/0016 |
| 2021/0101592 | A1* | 4/2021 | Kokes | B60W 40/04 |
| 2021/0171027 | A1* | 6/2021 | Kang | H04N 5/265 |
| 2021/0183246 | A1* | 6/2021 | Zack | G08G 1/0116 |
| 2021/0197807 | A1* | 7/2021 | Park | B60W 40/105 |
| 2021/0266715 | A1* | 8/2021 | Uchiyama | H04W 4/48 |
| 2022/0187432 | A1* | 6/2022 | Wang | G01S 17/86 |
| 2022/0317267 | A1* | 10/2022 | Voicu | G01S 7/487 |
| 2023/0037798 | A1* | 2/2023 | Dalmasso | G08G 1/096716 |
| 2023/0294682 | A1* | 9/2023 | Kim | G06T 7/70 |

FOREIGN PATENT DOCUMENTS

| | | | | |
|---|---|---|---|---|
| EP | 3337197 | A1 * | 6/2018 | ......... G01C 21/3415 |
| JP | 5063637 | B2 | 10/2012 | |
| JP | 2018-001962 | A | 1/2018 | |
| KR | 10-1833874 | B1 | 3/2018 | |

* cited by examiner

ADVANCED DRIVER ASSISTANCE SYSTEM, AND VEHICLE HAVING THE SAME

CROSS-REFERENCE TO RELATED APPLICATION

This application is based on and claims priority under 35 U.S.C. § 119 to Korean Patent Application No. 10-2021-0049691, filed on Apr. 16, 2021 in the Korean Intellectual Property Office, the disclosure of which is incorporated herein by reference.

BACKGROUND

1. Field

The disclosure relates to an advanced driver assistance system (ADAS) for preventing a collision with an obstacle while performing a cruise control mode, and a vehicle having the same.

2. Description of the Related Art

Recently, there have been development on various types of advanced driver assistance system (ADAS) that are designed to inform a driver of travel information about a vehicle to prevent an accident from occurring due to driver's inattentiveness and perform autonomous driving for driver's convenience.

One example of the ADAS is a technology for detecting an obstacle around a vehicle by installing a distance sensor on the vehicle and warning the driver of the obstacle.

Another example of the ADAS is a cruise control technology that allows the vehicle to travel while constantly adjusting the travelling velocity. With the recent development of technology, the cruise control has been developed not only to automatically control the travelling velocity but also control the distance from another vehicle, stopping and slowing, etc.

Another example of the ADAS is an autonomous driving technology in which the vehicle autonomously travels to the destination based on road information and current position information while detecting obstacles and avoiding the detected obstacles.

Such cruise control technology or autonomous driving technology recognizes a situation of the front of the vehicle using obstacle sensors, etc., and operates the engine or brake according to the recognized front situation to adjust the travelling velocity and inter-vehicle distance without driver intervention.

In other words, according to the existing cruise control technology or autonomous driving technology operates, a vehicle operates, when predicting a travelling situation to recognize a preceding vehicle travelling in front of the vehicle through an obstacle sensor, and adjust the distance between the vehicles and travelling velocity while tracking the preceding vehicle.

The cruise control or autonomous driving technology controls acceleration in response to a sudden departure of the preceding vehicle from the travelling path, and in this case, a collision may occur with another vehicle travelling in front of the preceding vehicle. In addition, cruise control or autonomous driving technology has a limitation in that a collision with a preceding vehicle occurs when the preceding vehicle suddenly brakes.

SUMMARY

Therefore, it is an object of the disclosure to provide an advanced driver assistance system (ADAS) for controlling a deceleration based on travel information of at least two other vehicles adjacent to a host vehicle in a travelling path of the host vehicle during a cruise control mode, and a vehicle having the same.

It is another object of the disclosure to provide an advanced driver assistance system (ADAS) for controlling braking in response to recognition of another vehicle that is stopped in a travelling path during a cruise control mode, and a vehicle having the same.

It is another object of the disclosure to provide an advanced driver assistance system (ADAS) for limiting acceleration and requesting a user to decelerate based on a change in heading direction during cruise control, and a vehicle having the same.

The technical objectives of the disclosure are not limited to the above, and other objectives may become apparent to those of ordinary skill in the art based on the following descriptions.

According to an aspect of the disclosure, there is provided an advanced driver assist system (ADAS) for performing cruise control in a first vehicle, the ADAS including: a communicator configured to communicate with a plurality of other vehicles; an obstacle detector configured to detect an obstacle in a surrounding and output obstacle information about the detected obstacle; and a controller configured to acquire distance information about a distance to a second vehicle travelling in the surrounding of the first vehicle among the obstacles based on the obstacle information detected by the obstacle detector during a cruise control mode, acquire travel information and position information of a third vehicle travelling in a surrounding of the second vehicle based on information received through the communicator, and controlling acceleration and deceleration based on the distance information with respect to the second vehicle, the travel information of the third vehicle, and the position information of the third vehicle.

The controller may be configured to: determine whether the second vehicle has departed from the travelling path based on the obstacle information detected by the obstacle detector; and upon determining that the second vehicle has departed from the travelling path, control acceleration and deceleration based on the travel information of the third vehicle.

The ADAS may further include a velocity detector configured to detect a travelling velocity of the first vehicle and output travelling velocity information about the detected travelling velocity, wherein the communicator is configured to receive current position information of the first vehicle, and the controller may be configured to acquire a first target deceleration based on the current position information of the first vehicle, the travelling velocity information of the first vehicle, and the distance information with respect to the second vehicle, acquire a second target deceleration based on the current position information of the first vehicle, the travelling velocity information of the first vehicle, the travelling information of the third vehicle, and the position information of the third vehicle, and control the deceleration based on the first target deceleration and the second target deceleration.

The controller may be configured to, if the third vehicle exists in the surrounding of the second vehicle, control the deceleration at a smaller target deceleration between the first target deceleration and the second target deceleration.

The ADAS may further include a velocity detector configured to detect the travelling velocity of the first vehicle and output travelling velocity information about the detected travelling velocity, wherein the communicator may be configured to receive current position information of the first vehicle, and the controller may be configured to acquire position information of an obstacle that is stopped in a travelling path based on road environment information received through the communicator, and control deceleration based on the acquired position information of the obstacle, the current position information of the first vehicle, and the travelling velocity information of the first vehicle.

According to another aspect of the disclosure, there is provided an advanced driver assist system (ADAS) for performing cruise control in a first vehicle, the ADAS including: an obstacle detector configured to detect an obstacle in a surrounding and output obstacle information about the detected obstacle; a velocity detector configured to detect a travelling velocity of the first vehicle and output actual travelling velocity information about the detected travelling velocity; a yaw rate detector configured to detect a yaw rate of the first vehicle and output yaw rate information about the detected yaw rate; and a controller configured to determine whether the first vehicle is turning based on the detected yaw rate information during a cruise control mode, upon determining that the first vehicle is turning, determine whether an obstacle exists in a surrounding based on the obstacle information, upon determining that there is no obstacle in the surrounding, acquire a yaw rate value and a yaw acceleration value based on the yaw rate information, and control acceleration limit based on the acquired yaw rate value, the yaw acceleration value, and the actual travelling velocity information.

The controller is configured to determine whether an acceleration limit condition is satisfied based on the acquired yaw rate value, the yaw acceleration value, and the travelling velocity information, upon determining that the acceleration limit condition is satisfied, control acceleration based on a target acceleration, and upon determining that the acceleration limit condition is not satisfied, control acceleration based on a preset acceleration.

The acceleration limit condition may include a condition in which the acquired yaw rate value is greater than or equal to a reference yaw rate value, the yaw acceleration value is greater than or equal to a reference yaw acceleration value, and the travelling velocity of the first vehicle is greater than a first reference travelling velocity and less than a second reference travelling velocity.

The ADAS may further include a steering angle detector configured to detect a steering angle of the first vehicle and output steering angle information about the detected steering angle, wherein the controller may determine whether the first vehicle is turning based on the detected steering angle information.

The ADAS may further include a lever signal receiver configured to receive a lever signal of a heading direction indicating lever, wherein the controller may be configured to, upon determining that an actual travelling velocity of the first vehicle is less than or equal to a target travelling velocity, another second vehicle does not exist in the surrounding of the first vehicle, and a turning drive command is received through the lever signal receiver, determine the acceleration limit condition.

The controller may be configured to, upon determining that an actual travelling velocity of the first vehicle is less than or equal to a target travelling velocity, another vehicle does not exist in the surrounding of the first vehicle, and a heading direction indicating lamp is turned on, determine the acceleration limit condition.

The controller may be configured to, upon determining two heading direction indicating lamps are turned on, determine an emergency lamp is turned on.

The controller may be configured to, when controlling the acceleration limit, control at least one of a display, a cluster, and a sound outputter to output deceleration request information.

The controller may be configured to control deactivation of a cruise control mode in response to receiving pressure information corresponding to a pressure applied to a brake pedal.

According to another aspect of the disclosure, there is provided a vehicle including: a communicator configured to communicate with a plurality of other vehicle and receiving current position information; an obstacle detector configured to detect an obstacle in a surrounding and output obstacle information about the detected obstacle; and a velocity detector configured to detect a travelling velocity and output actual travelling velocity information about the detected travelling velocity, and a controller configured to: acquire distance information about a distance to another vehicle travelling in a surrounding of the vehicle within a travelling path among the obstacles based on the obstacle information detected by the obstacle detector during a cruise control mode, acquire travel information and position information of another vehicle travelling in a surrounding of the another vehicle based on information received through the communicator, and control acceleration and deceleration based on the current position information of the vehicle, the distance information with respect to the another vehicle, and the travel information and the position information of the another vehicle that travels in the surrounding of the another vehicle.

The controller may be configured to acquire a first target deceleration based on the current position information, the travelling velocity information of the another vehicle, and the distance information with respect to the another vehicle, acquire a second target deceleration based on the current position information, the actual travelling velocity information, and the travelling information and the position information of the another vehicle that travels in the surrounding of the another vehicle, and control the deceleration at a smaller target deceleration between the first target deceleration and the second target deceleration.

The vehicle may further include a yaw rate detector configured to detect a yaw rate and output yaw rate information about the detected yaw rate, wherein the controller may be configured to determine whether the vehicle is turning based on the detected yaw rate information, and upon determining that the vehicle is turning, acquire a yaw rate value and a yaw acceleration value based on the yaw rate information, and control acceleration limit based on the acquired yaw rate value, the yaw acceleration value, and the actual travelling velocity information.

The controller may be configured to: determine whether an acceleration limit condition is satisfied based on the acquired yaw rate value, the yaw acceleration value, and the actual travelling velocity information; upon determining that the acceleration limit condition is satisfied, control acceleration based on a target acceleration; and upon determining that the acceleration limit condition is not satisfied, control acceleration based on a preset acceleration.

The acceleration limit condition may include a condition in which the acquired yaw rate value is greater than or equal to a reference yaw rate value, the yaw acceleration value is greater than or equal to a reference yaw acceleration value, and the travelling velocity of the first vehicle is greater than a first reference travelling velocity and less than a second reference travelling velocity.

The vehicle may further include a lever signal receiver configured to receive a lever signal of a heading direction indicating lever, wherein the controller may be configured to, upon determining that the actual travelling velocity of the vehicle is less than or equal to a target travelling velocity, the another vehicle does not exist, and a turning drive command is received through the lever signal receiver, determine the acceleration limit condition.

The controller may be configured to, when controlling the acceleration limit, control at least one of a display, a cluster, and a sound outputter to output deceleration request information.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
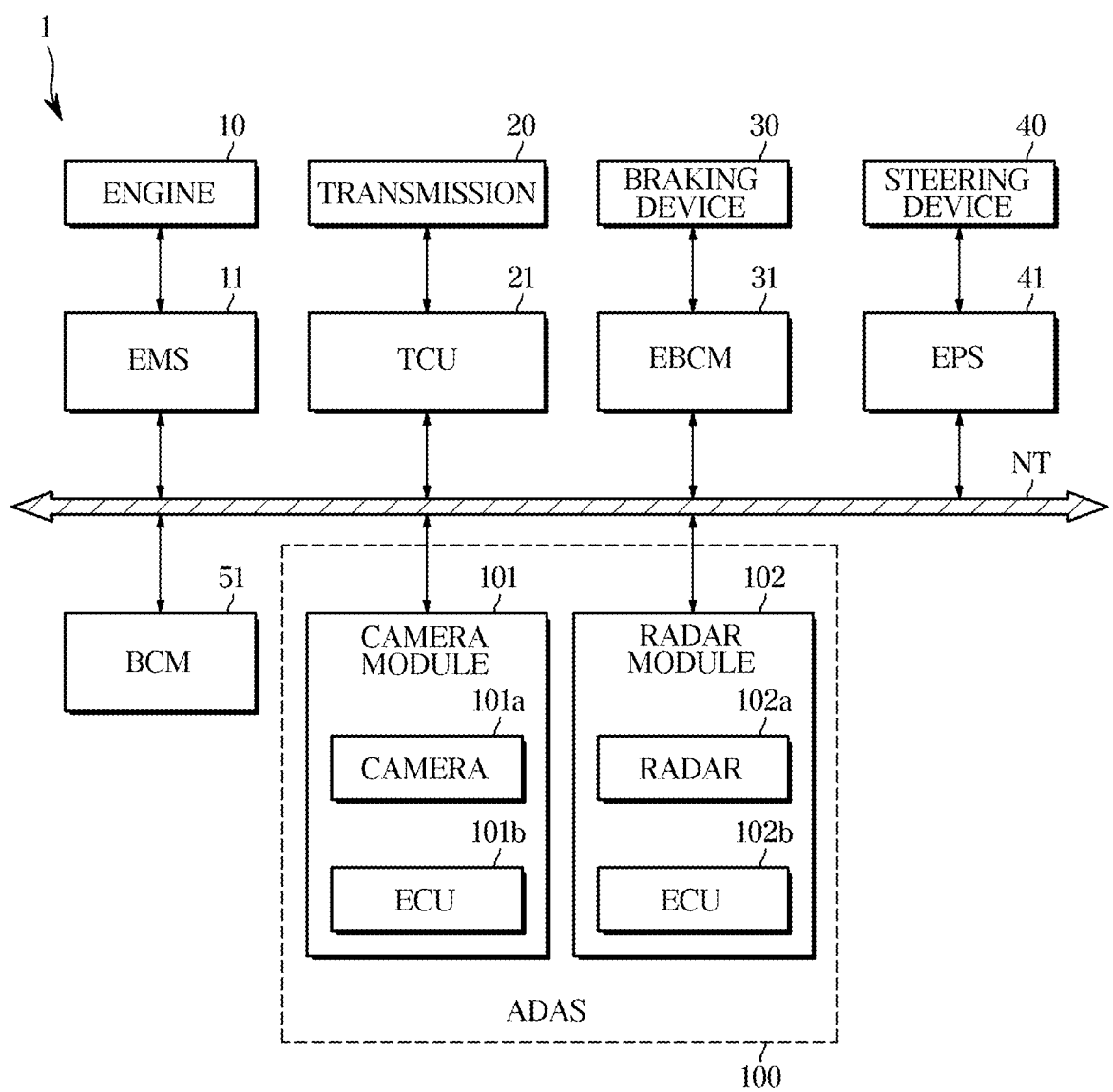
FIG. 1 is a block diagram illustrating a vehicle according to an embodiment.

Like numerals refer to like elements throughout the specification. Not all elements of embodiments of the present disclosure will be described, and description of what are commonly known in the art or what overlap each other in the embodiments will be omitted.

The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present disclosure will be described with reference to the accompanying drawings.

FIG. 1 is a block diagram illustrating a vehicle according to an embodiment.

The vehicle according to the embodiment may be a vehicle that performs a manual driving mode in which the vehicle travels in response to a driving intention of a driver and a cruise control mode in which the vehicle travels at a set velocity while maintaining a predetermined distance from other vehicles, and further performs an autonomous driving mode of autonomously travelling to a destination based on current position information of the vehicle and destination information.

The cruise control mode is a mode that allows a first vehicle to continuously travel while maintaining a constant velocity, and enables the driver to take off the foot from an accelerator pedal during long-distance driving.

Cruise control may also be referred to as active cruise control (ACC), adaptive cruise control, smart cruise control (SCC), advanced smart cruise control, and dynamic radar cruise control (DRCC).

The vehicle according to the embodiment may be an internal combustion engine vehicle or an eco-friendly vehicle.

In the present embodiment, a vehicle which performs a cruise control mode as an internal combustion engine vehicle will be described as an example.

Referring to FIG. 1, a vehicle 1 includes an engine 10, a transmission 20, a braking device 30, and a steering device 40.

The engine 10 may include a cylinder and a piston, and generate power required for the vehicle 1 to travel.

The transmission 20 may include a plurality of gears, and transmit the power generated by the engine 10 to the wheels.

The braking device 30 may decelerate or stop the vehicle 1 through friction with the wheels.

The steering device 40 may change the heading direction of the vehicle 1.

The vehicle 1 may include a plurality of electronic components.

For example, the vehicle 1 may include an engine management system (EMS) 11, a transmission control unit (TCU) 21, an electronic brake control module (EBCM) 31, an electronic power steering (EPS) 41, a body control module (BCM), and an advanced driver assistance system (ADAS).

The EMS 11 may control the engine 10 in response to an acceleration intention of the driver through an accelerator pedal or a request of the ADAS 100. For example, the EMS 11 may control the torque of the engine 10.

The TCU 21 may control the transmission 20 in response to a shift command of the driver through a shift lever and/or a travelling velocity of the vehicle 1. For example, the TCU 21 may adjust the gear ratio of the engine 10 to the wheels.

The EBCM 31 may control the braking device 30 in response to a braking intention of the driver through a braking pedal and/or a slip of the wheels. For example, the EBCM 31 may temporarily deactivate the braking of the wheels in response to a slip of the wheels detected at a time of braking of the vehicle 1 (anti-lock braking systems: ABS).

The EBCM 31 may selectively deactivate braking of the wheels in response to over-steering and/or under-steering detected at a time of steering of the vehicle 1 (electronic stability control: ESC)

In addition, the EBCM 31 may temporarily brake the wheels in response to a slip of the wheels detected at a time of driving of the vehicle 1 (traction control system: TCS).

The EPS 41 may assist the operation of the steering device 40 in response to a steering intention of the driver through the steering wheel such that the driver may easily operate the steering wheel. For example, the EPS 41 may assist the operation of the steering device 40 such that the steering force is reduced during low-speed travelling or parking and the steering force is increased during high-speed travelling.

The BCM 51 may control the operation of machine parts that provide convenience to the driver or ensure the safety of the driver. For example, the BCM 51 may control a head lamp, a wiper, a cluster, a multifunction switch, a turn signal lamp, and the like.

The ADAS 100 may assist the driver in manipulating (driving, braking, and steering) the vehicle 1. For example, the ADAS 100 may detect a surrounding environment of the vehicle 1 (e.g., another vehicle, a pedestrian, a cyclist, a lane, a road sign, and the like), and control driving and/or braking and/or steering of the vehicle 1 in response to the detected environment.

The ADAS 100 may provide the driver with various functions. For example, the ADAS 100 may include a lane departure warning (LDW), a lane keeping assist (LKA), a high beam assist (HBA), an automatic emergency braking (AEB), a traffic sign recognition (TSR), a smart cruise control (SCC), a blind spot detection (BSD), and the like.

The ADAS 100 may include an autonomous driving control device that allows a vehicle to recognize a road environment of the vehicle itself, determine obstacles and driving conditions, and controlling the driving of the vehicle according to a planned travelling path while avoiding obstacles.

The ADAS 100 includes a camera module 101 that acquires image data of the surrounding of the vehicle 1 and a radar module 102 that acquires object data of the surrounding of the vehicle 1.

The camera module 101 may include a camera 101*a* and an electronic control unit (ECU) 101*b*, and photograph the surrounding of the vehicle 1 and recognize another vehicle, a pedestrian, a cyclist, a lane, a road sign, and the like.

The radar module 102 may include a radar 102*a* and an ECU 102*b*, and acquire a relative position, a relative velocity, and the like of an obstacle of the surrounding of the vehicle 1 (e.g., another vehicle, a pedestrian, a cyclists, and the like).

The above-described electronic components may communicate with each other through vehicle communication network NT. For example, the machine parts may transmit data through Ethernet, media-oriented systems transport (MOST), Flexray, controller area network (CAN), local interconnect network (LIN), and the like.

The ADAS 100 may provide the EMS 11, the EBCM 31, and the EPS 41 with a drive control signal, a brake control signal and a steering control signal, respectively.

Figure 2:
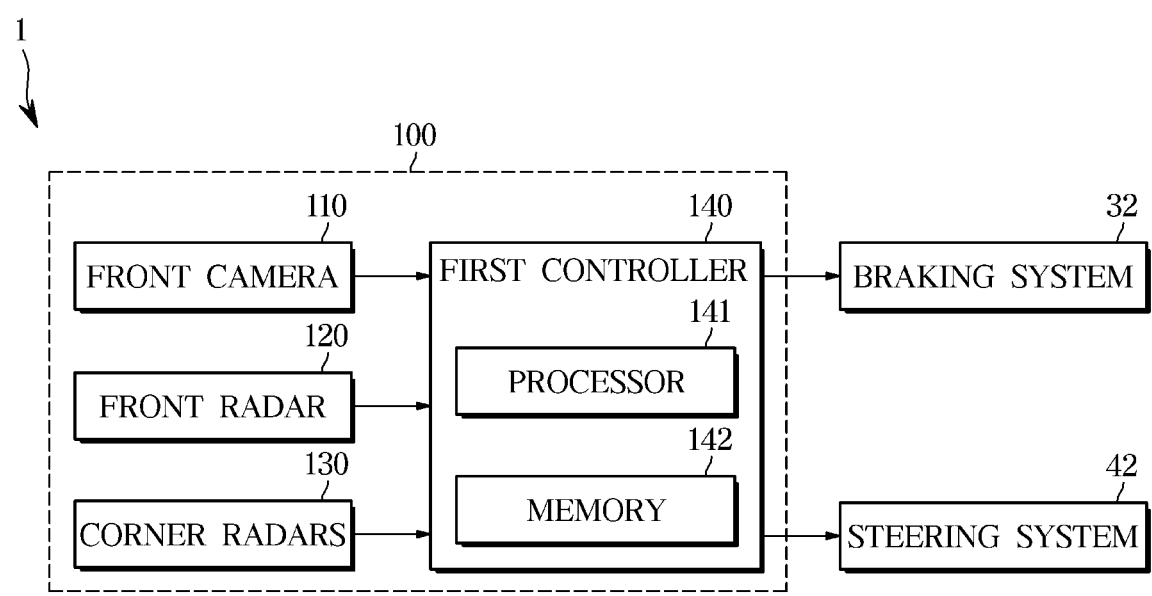
FIG. 2 is a block diagram illustrating an advanced driver assist system (ADAS) provided in a vehicle according to an embodiment.
Figure 3:
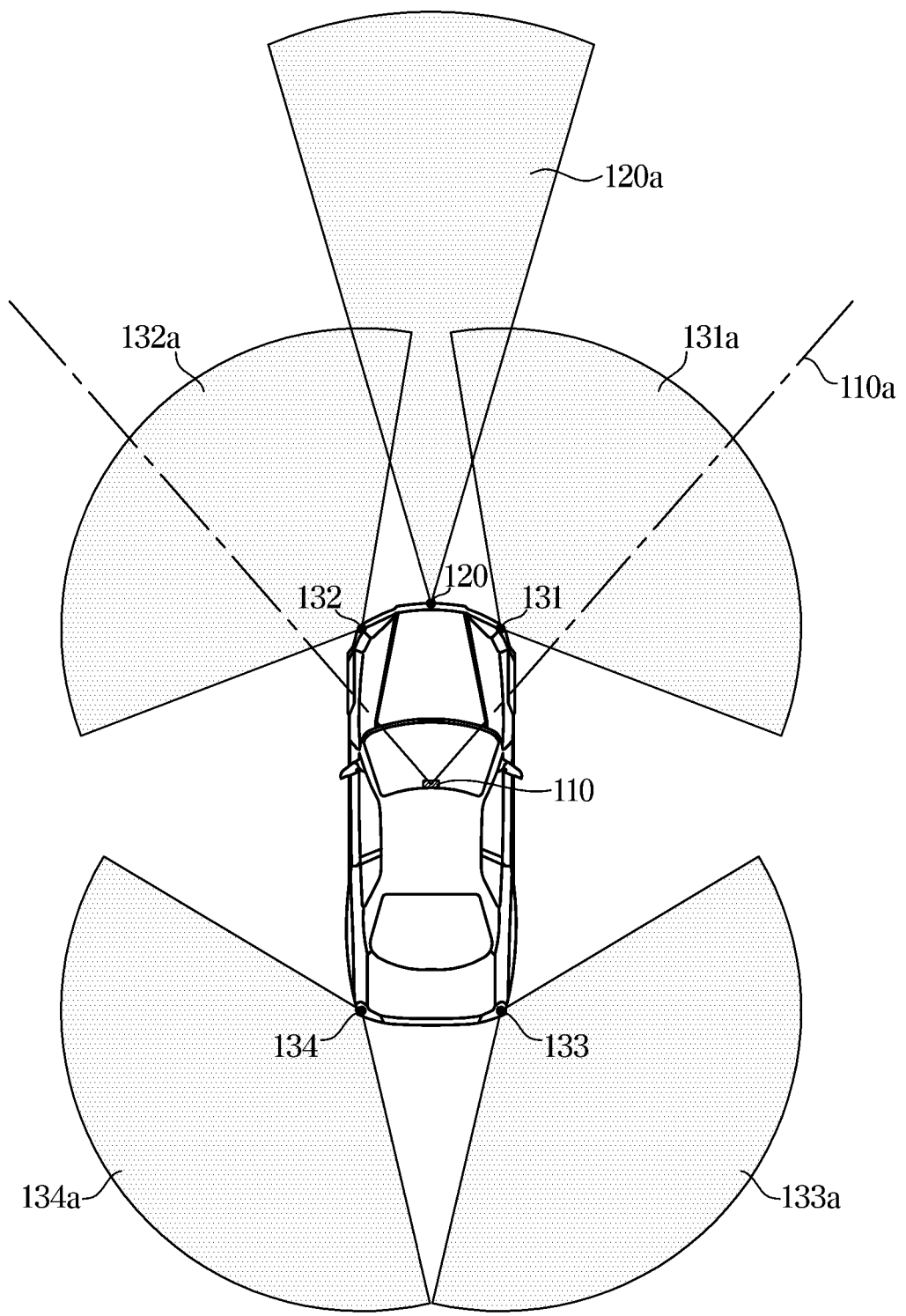
FIG. 3 is a diagram illustrating an example of detection areas of a camera and a radar included in an ADAS of a vehicle according to an embodiment.

FIG. 2 is a block diagram illustrating an advanced driver assist system (ADAS) provided in a vehicle according to an embodiment, and FIG. 3 is a diagram illustrating an example of detection areas of a camera and a radar included in an ADAS of a vehicle according to an embodiment.

The ADAS according to the present embodiment may perform a collision avoidance function for preventing collision with an obstacle while travelling. In this case, the ADAS may control braking to avoid collision. That is, the ADAS according to the present embodiment may be a collision avoidance device or a brake control device.

Referring to FIG. 2, the vehicle 1 may include a braking system 32, a steering system 42, and the ADAS 100.

The braking system 32 may include the EBCM (31 in FIG. 1) and the braking device 30 (30 in FIG. 1) described in conjunction with FIG. 1, and the steering system 42 may include the EPS 41 (41 in FIG. 1) and the steering device (40 in FIG. 1).

The ADAS 100 according to the embodiment may include a front camera 110 as a camera of the camera module 101, and a front radar 120 and a plurality of corner radars 130 (131, 132, 133, and 134) as radars of the radar module 102.

Referring to FIG. 3, the ADAS 100 may include the front camera 110 having a field of view 110*a* directed toward the front of the vehicle 1, and the front radar 120 and the plurality of corner radars 130.

The front camera 110 may be installed, for example, on a front windshield of the vehicle 1.

The front camera 110 may photograph the front of the vehicle 1 and acquire image data regarding the front of the vehicle 1. The image data regarding the front of the vehicle 1 may include position information of at least one of another vehicle, a pedestrian, a cyclist, a lane, a curb, a guard rail, a roadside tree, a street lamp, or the like in front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to a first controller 140. For example, the front camera 110 may be connected to the first controller 140 through a vehicle communication network NT, through a hard wire, or through a printed circuit board (PCB).

The front camera 110 may transmit the image data of the front of the vehicle 1 to the first controller 140.

The front radar 120 according to the embodiment may have a field of sensing 120*a* directed to the front of the vehicle 1. The front radar 120 may be installed, for example, in a grille or a bumper of the vehicle 1.

The front radar 120 may include a transmission antenna (or a transmission antenna array) that radiates transmission radio waves to the front of the vehicle 1 and a reception antenna (or a reception antenna array) that receives reflection radio waves reflected from an object.

The front radar 120 may acquire front radar data from the transmission radio waves transmitted by the transmission antenna and the reflection radio waves received by the reception antenna.

The front radar data may include position information and velocity information regarding another vehicle, a pedestrian, or a cyclist existing in front of the vehicle 1.

The front radar 120 may calculate the relative distance to the obstacle based on the phase difference (or time difference) between the transmission radio waves and the reflection radio waves, and calculate the relative velocity of the obstacle based on the frequency difference between the transmission radio waves and the reflected radio waves.

The front radar 120 may be connected to the first controller 140 through a vehicle communication network NT, a hard wire, or a printed circuit board. The front radar 120 may transmit the front radar data to the first controller 140.

The plurality of corner radars 130 includes a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

The first corner radar 131 may have a field of sensing 131*a* directed to the front right side of the vehicle 1. The first corner radar 131 may be installed, for example, on the right side of a front bumper of the vehicle 1.

The second corner radar 132 may have a field of sensing 132*a* directed to the front left side of the vehicle 1, and may be installed, for example, on the left side of the front bumper of the vehicle 1.

The third corner radar 133 may have a field of sensing 133*a* directed to the rear right side of the vehicle 1 and may be installed, for example, on the right side of a rear bumper of the vehicle 1.

The fourth corner radar 134 may have a field of sensing 134*a* directed to the rear left side of the vehicle 1 and may be installed, for example, on the left side of the rear bumper of the vehicle 1.

Each of the first, second, third and fourth corner radars 131, 132, 133, and 134 may include a transmission antenna and a reception antenna.

The first, second, third, and fourth corner radars 131, 132, 133 and 134 acquire first corner radar data, second corner radar data, third corner radar data, and fourth corner radar data, respectively.

The first corner radar data may include distance information and velocity information regarding another vehicle, a pedestrian, or a cyclists (hereinafter referred to as "an obstacle") positioned on the front right side of the vehicle 1.

The second corner radar data may include distance information and velocity information regarding an obstacle positioned on the front left side of the vehicle 1.

The third corner radar data may include distance information and velocity information regarding an obstacle positioned on the rear right side of the vehicle 1, and the fourth corner radar data may include distance information and velocity information regarding an obstacle positioned on the rear left side of the vehicle 1.

Each of the first, second, third, and fourth corner radars 131, 132, 133 and 134 may be connected to the first controller 140, for example, through a vehicle communication network NT, a hard wire, or a printed circuit board. The first, second, third, and fourth corner radars 131, 132, 133, and 134 may respectively transmit the first corner radar data, the second corner radar data, the third corner radar data, and the fourth corner radar data to the first controller 140.

The first controller 140 may include the ECU (101*b* in FIG. 1) of the camera module (101 in FIG. 1) and/or the ECU (102*b* in FIG. 1) of the radar module (102 in FIG. 1), and/or an integrated ECU.

The first controller 140 includes a processor 141 and a memory 142.

The processor 141 may process the front image data of the front camera 110, the front radar data of the front radar 120, and the pieces of corner radar data of the plurality of corner radars 130, and generate a braking signal and a steering signal for controlling the braking system 32 and the steering system 42.

For example, the processor 141 may include an image signal processor for processing the front image data of the front camera 110 and/or a digital signal processor for processing radar data of the radars 120 and 130, and/or a micro control unit (MCU) for generating a braking signal and/or a steering signal.

The processor 141 may detect obstacles (e.g., another vehicle, a pedestrian, a cyclist, a curb, a guard rail, a roadside tree, a street lamp, and the like) in front of the vehicle 1 based on the front image data of the front camera 110 and the front radar data of the radar 120.

In detail, the processor 141 may acquire position information (distance and direction) and velocity information (relative velocity) of the obstacles in front of the vehicle 1 based on the front radar data of the front radar 120. The processor 141 may acquire position information (direction) and type information (for example, whether the obstacle is another vehicle, a pedestrian, a cyclist, a cub, a guard rail, a roadside tree, a street lamp, or the like) of the obstacle existing in front of the vehicle 1 based on the front image data of the front camera 110.

In addition, the processor 141 may match the obstacles detected by the front image data with the obstacles detected by the front radar data, and acquire the type information, the position information, and the velocity information of the obstacles in front of the vehicle 1 based on a result of the matching.

The processor 141 may generate a braking signal and a steering signal based on the type information, the position information, and the velocity information of the front obstacles.

For example, the processor 141 calculates a time to collision (TTC) between the vehicle 1 and the front obstacles based on the position information (relative distance) and the velocity information (relative velocity) of the front obstacles, and based on a result of comparing the TTC with a predetermined reference time, warns the driver of a collision, transmits a braking signal to the braking system 32, or transmits a steering signal to the steering system 42.

In response to the TTC being less than a predetermined first reference time, the processor 141 may allow an alert to be output via audio and/or display.

In response to the TTC being less than a predetermined second reference time, the processor 141 may transmit a preliminary-braking signal to the braking system 32.

In response to the TTC being less than a predetermined third reference time, the processor 141 may transmit an emergency braking signal to the braking system 32. In this case, the second reference time is shorter than the first reference time, and the third reference time is shorter than the second reference time.

The processor 141 may transmit a steering signal to the steering system 42 based on the direction information included in the position information of the front obstacles.

As another example, the processor 141 may calculate a distance to collision (DTC) based on the velocity information (relative velocity) of front objects, and based on a result of comparing the DTC with distances to the front objects, warn the driver of a collision or transmit a braking signal to the braking system 32.

The processor 141 may acquire position information (distance and direction) and velocity information (relative velocity) of the obstacles on the sides of the vehicle 1 (front right, front left, rear right, and rear left) based on the pieces of corner radar data of the plurality of corner radars 130.

The memory 142 stores programs and/or data for processing image data by the processor 141, programs and/or data for processing radar data by the processor 141, and programs and/or data for generating a braking signal and/or a steering signal by the processor 141.

The memory 142 may temporarily memorize the image data received from the front camera 110 and/or the radar data received from the radars 120 and 130, and may temporarily memorize a result of processing the image data and/or the radar data of the processor 141.

The memory 142 may not only include a volatile memory, such as an S-RAM, a D-RAM, and the like, but also include a non-volatile memory, such as a flash memory, a read only memory (ROM), an erasable programmable read only memory (EPROM), and the like.

Figure 4:
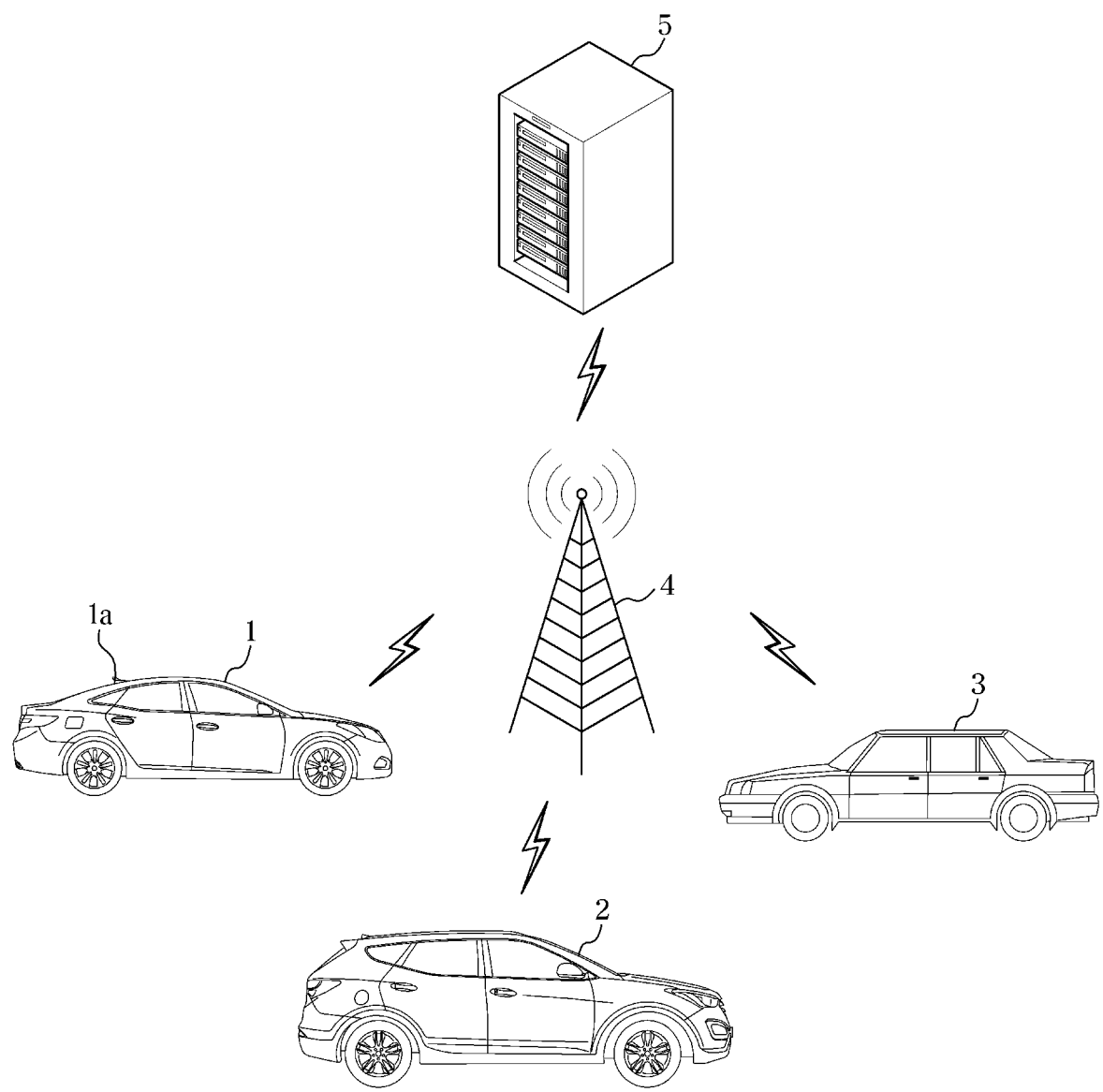
FIG. 4 is a diagram illustrating an example of communication of a vehicle according to an embodiment.

FIG. 4 is a diagram illustrating an example of communication of a vehicle according to an embodiment.

In FIG. 4, communication between a first vehicle 1, a second vehicle 2, a third vehicle 3, infrastructure 4, and a server 5 is illustrated.

The first vehicle 1 may perform communication (V2I communication) with the infrastructure 4. In addition, the first vehicle 1 may perform communication (V2V communication) with the second and third vehicles, which are other vehicles.

The first vehicle 1 may communicate with the infrastructure 4 and communicate with the server 5. The vehicle 1 may communicate indirectly with the server 5 through the infrastructure 4 of the road.

The first vehicle 1 may radiate electromagnetic waves to the outside through an antenna 1*a*. In this case, the antenna 1*a* may emit an electromagnetic wave corresponding to an electrical signal transmitted from a second controller 280 provided in the first vehicle 1.

In this case, the first vehicle 1 receives electromagnetic waves emitted from at least one of the second and third vehicles 2 and 3 and the infrastructure 4 through the antenna 1*a*, and converts the received electromagnetic waves into an electrical signal.

A driving module of the antenna 1*a* of the first vehicle 1 demodulates the received electromagnetic wave to convert the received electromagnetic wave into an electrical signal, and transmits the electrical signal to the second controller 280. In this case, the second controller 280 of the first vehicle 1 generates a control signal corresponding to the converted electrical signal and uses the generated control signal to control the first vehicle 1.

The infrastructure 4 may perform wireless communication with one or more vehicles 1, 2, and 3 travelling in the vicinity, and may perform at least one of wired communication and wireless communication with the server 5.

The infrastructure 4 may transmit various types of information transmitted from the server 5 to the one or more vehicles 1, 2, and 3 travelling in the vicinity. When the infrastructure 4 transmits information to the first vehicle 1, the infrastructure 4 may convert an electrical signal corresponding to information desired to be transmitted into an electromagnetic wave and emit the converted electromagnetic wave through an antenna provided in the infrastructure 4.

The infrastructure 4 may transmit information received from the one or more vehicles 1, 2, and 3 travelling in the vicinity to the server 5.

The infrastructure 4 may receive electromagnetic waves emitted from the antenna 1*a* of the first vehicle 1 through the antenna of the infrastructure, and obtain information provided from the first vehicle 1 using an electrical signal corresponding to the received electromagnetic waves. For example, upon receiving vehicle position information from the first vehicle 1, the infrastructure 4 may transmit the position information and identification information of the vehicle to the server 5.

The server 5 may be a server that manages the vehicles 1, 2, and 3 and provides various types of information about the vehicles 1, 2, and 3. The server 5 may be a server of a vehicle manufacturer, a server of a position sharing service center, a server of an autonomous driving service center, or a server of a traffic information service center.

The first vehicle may include a position receiver that receives vehicle position information and transmits the received vehicle position information to the second controller 280. The position receiver may be provided in a communicator 250.

The position receiver may include a global positioning system (GPS) receiving device that communicates with a plurality of satellites to calculate the position of the vehicle.

The position receiver includes a GPS signal receiver and a signal processor for processing GPS signals acquired by the GPS signal receiver. Here, GPS signal receiver includes an antenna for receiving signals from a plurality of GPS satellites. The antenna may be provided on the exterior of the vehicle.

The signal processor of the position receiver includes software for acquiring a current position using distance and time information corresponding to position signals of a plurality of GPS satellites, and an outputter for outputting the acquired position information of the vehicle.

The first vehicle may communicate with various electronic devices included in the first vehicle.

The first vehicle may include one or more components that enable communication with an external device, and may include at least one of a short-range communication module, a wired communication module, and a wireless communication module.

The short-range communication module may include various short-range communication modules that transmit and receive signals using a wireless communication network in a short range, such as a Bluetooth module, an infrared communication module, a radio frequency identification (RFID) communication module, a wireless local access network (WLAN) communication module, an NFC communication module, and a ZigBee communication module.

The wired communication module may include various wired communication modules, such as a controller area network (CAN) communication module, a local area network (LAN) module, a wide area network (WAN) module, or a value added network communication (VAN) module, and various cable communication modules, such as a universal serial bus (USB) module, a high definition multimedia interface (HDMI) module a digital visual interface (DVI)

module, a recommended standard-232 (RS-232) module, a power line communication module, or a plain old telephone service (POTS) module.

The wireless communication module may include wireless communication modules supporting various wireless communication methods, such as a Wifi module, a wireless broadband module (Wibro) module, a global system for mobile communication (GSM) module, a code division multiple access (CDMA) module, a wideband code division multiple access (WCDMA) module, a universal mobile telecommunications system (UMTS) module, a time division multiple access (TDMA) module, a long term evolution (LTE) module, and the like.

Figure 5:
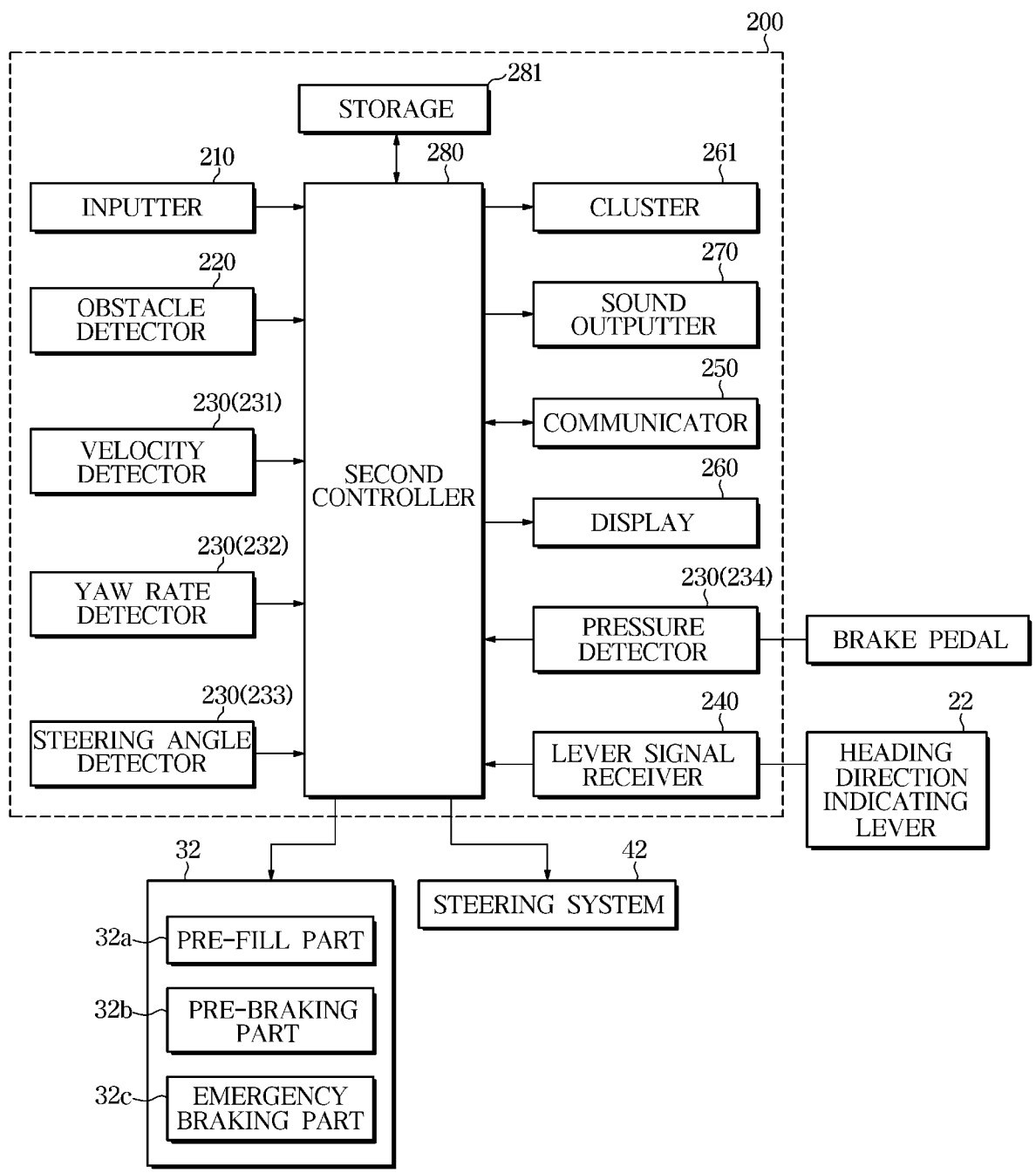
FIG. 5 is a block diagram illustrating a cruise control device in an ADAS system provided in a vehicle according to an embodiment.

FIG. 5 is a block diagram illustrating a cruise control device 200 for performing a cruise control mode, which is a driver assistance system provided in a vehicle (i.e., the first vehicle) according to an embodiment.

In addition, the cruise control device may correspond to a second controller, and may communicate with an inputter 210, an obstacle detector 220, a travel information detector 230, a lever signal receiver 240, a communicator 250, a display 260, a cluster 261, a sound outputter 270, and a storage 281.

The following description will be made in relation that a host vehicle is a first vehicle, another vehicle travelling in a surrounding of the host vehicle is a second vehicle, and a vehicle travelling in a surrounding of the second vehicle is a third vehicle. Here, the surrounding may include the front.

The cruise control device 200, which is a driver assistance system, may include the inputter 210, the obstacle detector 220, the travel information detector 230, the lever signal receiver 240, the communicator 250, the display 260, the cluster 261, the sound outputter 270, the second controller 280, and the storage 281, and may further include the braking system 32 and the steering system 42.

The inputter 210 receives a user input.

The inputter 210 may receive an on command and an off command of a cruise control mode, and transmit a signal corresponding to the received command to the second controller 280.

The inputter 210 may receive an operation command for one of functions that may be performable in the first vehicle 1. For example, the inputter 210 may receive an operation command regarding at least one of a radio function, an audio function, a video function, a map display function, a navigation function, a DMB function, a content playback function, and an Internet search function.

The inputter 210 may also receive a target travelling velocity for performing a cruise control mode.

The inputter 210 may receive an on command and an off command of a collision risk notification mode that indicates the possibility of collision with an obstacle.

The inputter 210 may be provided in a head unit or a center fascia in the first vehicle 1, or may be provided in a vehicle terminal. The inputter 210 may be provided as a button, a key, a switch, an operation lever, a jog dial, or the like, or may be provided as a touch pad.

The obstacle detector 220 detects an obstacle located on the front and left and right sides of the first vehicle 1 and transmits obstacle information about the detected obstacle to the second controller 280. Here, the position information of the obstacle may include distance information with respect to the obstacle and direction information of the obstacle. The distance information about the distance to the obstacle may be distance information about a relative distance to the obstacle.

The obstacle detector 220 may include a front radar 120 and first and second corner radars 131 and 132, and may further include a front camera.

In addition, the obstacle detector 220 may include a light detection and ranging (Lidar) sensor. A LiDAR sensor is a non-contact distance detection sensor using the principles of a laser radar. A LiDAR sensor may include a transmitter for transmitting a laser and a receiver for receiving a laser, which is reflected from a surface of an object existing within a sensor range and then is returned.

The obstacle detector 220 may include an ultrasonic sensor.

The ultrasonic sensor generates ultrasonic waves for a predetermined period of time and detects a signal, which is reflected by an object and then is returned. Such an ultrasonic sensor may be used to determine the presence or absence of an obstacle, such as a pedestrian, in a short range.

The obstacle detector 220 may also detect an obstacle on the rear of the first vehicle 1.

The first vehicle 1 may include the travel information detector 230 that detects travel information of the vehicle, such as travelling velocity information, heading direction information, yaw rate information, deceleration information, and acceleration information. That is, the travel information detector 230 may include a velocity detector 231, a yaw rate detector 232, a steering angle detector 233, and a pressure detector 234.

The velocity detector 231 may include a plurality of wheel velocity sensors. The velocity detector 231 may include an acceleration sensor. The velocity detector 231 may include a plurality of wheel velocity sensors and an acceleration sensor.

When the velocity detector 231 is provided using an acceleration sensor, the second controller 240 may acquire the acceleration of the first vehicle 1 based on information detected by the acceleration sensor, and may acquire the travelling velocity of the host vehicle based on the acquired acceleration.

When the velocity detector 231 is provided as an acceleration sensor and a plurality of wheel velocity sensors, the second controller 280 may acquire the acceleration of the first vehicle 1 based on information detected by the acceleration sensor, and may acquire the travelling velocity of the first vehicle 1 based on velocity information acquired by the plurality of wheel velocity sensors.

The yaw rate detector 232 detects a yaw moment of the first vehicle 1. The yaw rate detector 232 detects the rotation angular velocity, which is the yaw rate in the vertical axis direction of the vehicle.

The yaw rate detector 232 may be provided on the body of the first vehicle 1, may be provided on the lower side of the center console, a driver's seat, etc., but the disclosure is not limited thereto.

The first vehicle 1 may be provided inside thereof with a steering wheel for adjusting the heading direction, a brake pedal pressed by the user according to a braking intention of a user (i.e., a driver), and an accelerator pedal pressed by the user according to an intention of a user to accelerate, and further include a heading direction indicating lever 22 provided on the periphery of the steering wheel to indicate a turning direction for a left turn, right turn, and U-turn.

The steering angle detector 233 detects the angular velocity of the steering wheel for detecting the steering angle of the vehicle. That is, the steering angle detector 233 may include an angular velocity detector.

The pressure detector 234 detects a pressure applied to the brake pedal.

The first vehicle 1 may further include a pressure detector that detects a pressure applied to the accelerator pedal (i.e., the accelerator pedal).

The lever signal receiver 240 receives a lever signal corresponding to a manipulation direction of the heading direction indicating lever 22 and transmits the received lever signal to the second controller 280.

The lever signal corresponding to the manipulation direction may include a lever signal for a left turn and a lever signal for a right turn.

The first vehicle 1 may further include a lamp signal receiver (not shown) that receives a signal of a heading direction indicating lamp that is turned on or turned off in response to manipulation of the heading direction indicating lever.

That is, the heading direction indicating lever 22 is connected to a left turn indicating lamp and a right turn indicating lamp to serve as a switching for turning on the left turn indicating lamp in response to a manipulation corresponding to a left turn, and turning on the right turn indicating lamp in response to a manipulation corresponding to a right turn.

The heading direction indicating lamp may be turned on and off based on navigation information and current position information according to a command of the second controller 280.

The communicator 250 may communicate with the second and third vehicles 2 and 3 in the surrounding of the first vehicle, and in this case, may receive at least one of identification information, current position information, travelling path information, destination information, and travelling velocity information of the second and third vehicles 2 and 3, and transmit at least one of identification information, current position information, travelling path information, destination information, and travelling velocity information of the first vehicle to the second and third vehicles 2 and 3.

The communicator 250 may communicate with at least one of the infrastructure 4 and the server 5 to receive information about the nearby vehicles 2 and 3, and also to transmit information about the first vehicle 1 to at least one of the infrastructure 4 and the server 5. For example, the communicator 250 may receive at least one of identification information, current position information, travelling path information, destination information, and travelling velocity information of the second and third vehicles 2 and 3 from the infrastructure 4 or the server 5.

The display 260 displays operation information about a function in operation. For example, the display 260 may display information related to a phone call, display information about content output through a terminal (not shown), display information related to music reproduction, or display external broadcast information.

The display 260 may display map information, and also display map information, in which a path to a destination is matched, and path guidance information. The display 260 may also display heading direction information, that is information about a straight driving, left turn, right turn, or U-turn.

The display 260 may display on-information and off-information of a cruise control mode, and may display on-information and off-information of a collision risk notification mode.

The display 260 may display an image of a road or display position information of pedestrians and position information of other vehicles.

The display 260 may display collision risk information indicating a collision with an obstacle as an image.

The display 260 may display deceleration information and steering information for obstacle avoidance as images.

The display 260 may display deceleration guidance information and steering guidance information for preventing collision of the third vehicle 3 as images.

The display 260 may display an image or turn on/off the light in response to a control command of the second controller 280.

The display 260 may be a lamp, such as a light emitting diode (LED) light or a flat panel display device, such as a liquid crystal display (LCD) light.

The display 260 may be a display panel provided in a terminal for a vehicle.

The display 260 may include a cluster 261 provided in the first vehicle 1.

The cluster 261 may include a lamp indicating collision risk information. The cluster 261 may turn on or turn off the lamp in response to a control command of the second controller 280.

The cluster 261 may display an image about collision risk information.

The cluster 261 may include a tachometer, a speedometer, a coolant thermometer, a fuel gauge, a turn signal light, a high beam indicating light, a warning light, a seat belt warning light, an odometer, a shift lever indicating light, a door open warning light, an engine oil warning light, a low fuel warning light, etc.

The sound outputter 270 outputs sound in response to a control command of the second controller 280 at a level corresponding to the control command of the second controller 280.

The sound outputter 270 may output warning information as a sound to notify a danger of collision with an obstacle. The sound outputter 270 may include one, or two or more speakers.

The sound outputter 270 may output a sound for requesting deceleration to prevent collision with the second and third vehicles 2 and 3 in front of the first vehicle 1.

The sound outputter 270 may output sounds for a collision risk notification of a collision with the second vehicle 2 and the third vehicle 3 in front of the first vehicle 1, for example, different sounds.

The second controller 280 may, if an ON signal for the ON command of the cruise control mode is received through the inputter 210, perform the cruise control mode.

The second controller 280 may, in the execution of the cruise control mode, control the vehicle to travel at a preset target travel velocity or at a target travel velocity input by the user, and control deceleration or acceleration based on obstacle information detected by the obstacle detector 220, and control output of collision risk information.

Here, the collision risk information may be output or not be output depending on whether a collision risk notification mode is selected by the user.

The second controller 280 may, upon determining that there is no obstacle ahead based on the obstacle information detected by the obstacle detector 220 during execution of the cruise control mode, travel at a target travelling velocity based on travelling velocity information detected by the velocity detector 231.

The second controller 280 may control acceleration or deceleration based on travel information of at least two other vehicles travelling in front of the first vehicle in the travelling path of the first vehicle during execution of the cruise control mode.

The second controller 280 may control braking based on travel information of the second vehicle 2, which is an obstacle in a surrounding, based on obstacle information detected by the obstacle detector 220 during execution of the cruise control mode, and road environment information and travel information of the third vehicle 3 received through the communicator 250. Here, the surrounding may include the front.

The second controller 280 may acquire relative distance information and relative velocity information of the second vehicle 2 based on obstacle information detected by the obstacle detector 220 during execution of the cruise control mode, and acquire a first target deceleration based on the acquired relative distance information and relative velocity information of the second vehicle 2, and may acquire a second target deceleration based on relative distance information and relative velocity information of the third vehicle 3 based on position information and travelling velocity information of the third vehicle 3 received through the communicator 250, and control braking based on the first target deceleration and the second target deceleration.

The second controller 280 may identify a smaller target deceleration between the first target deceleration and the second target deceleration and control braking based on the identified target deceleration.

The second controller 280 may control braking based on obstacle information about an obstacle existing on the travelling path of the first vehicle among pieces of information received from the communicator 250. Here, the obstacle information may be information about obstacles, such as a rockfall, a pedestrian, a bicycle, or a circuit breaker, which are not other vehicles.

The second controller 280 may control braking based on road environment information, travel information of the second vehicle, position information of the second vehicle, position information of the third vehicle 3, and travel information of the third vehicle that are received through the communicator 250 during execution of the cruise control mode.

The second controller 280 may control acceleration limit based on obstacle information detected by the obstacle detector 220, a target travelling velocity input to the inputter 210, travelling velocity information detected by the velocity detector 231, and a lever signal received by the lever signal receiver 240 during execution of the cruise control mode, and control maintenance of the cruise control mode.

The second controller 280 may control output of deceleration request information based on obstacle information detected by the obstacle detector 220, a target travelling velocity input to the inputter 210, travelling velocity information detected by the velocity detector 231, and a lever signal received by the lever signal receiver 240 during execution of the cruise control mode, and may control deactivation of a cruise control mode based on pressure information detected by the pressure detector 234.

The second controller 280 may determine whether the heading direction is changed based on steering angle information detected by the steering angle detector 233 or yaw rate information detected by the yaw rate detector 232, and may determine whether the heading direction is changed based on the difference in wheel velocities. Here, the change in the heading direction may include changing driving lanes.

The second controller 280 may control output of deceleration request information based on whether the heading direction is changed during execution of the cruise control mode.

The second controller 280 may determine the heading direction based on navigation information during execution of the cruise control mode, and if the determined heading direction is a left turn, right turn, or U-turn direction, control output of deceleration request information, and may control deactivation of the cruise control mode based on pressure information detected by the pressure detector 234.

The second controller 280 may, in the controlling of the braking, control an operation of at least one of a pre-fill part 32a, a pre-braking part 32b, and an emergency braking part 32c in the braking system 32 based on information about a time to collision with the second vehicle 2 or the third vehicle 3 or relative distance information with respect to the second vehicle 2 or the third vehicle 3.

For example, the second controller 280 may control at least one of the pre-fill part 32a, the pre-braking part 32b, and the emergency braking part 32c based on first, second, and third braking distances and relative distance information with respect to the second vehicle 2.

The first braking distance is a braking distance for controlling the pre-fill part 32a, the second braking distance is a braking distance for controlling the pre-braking part 32b, and the third braking distance is a braking distance for controlling the emergency braking part 32c, and each of the first to third braking distances may be a preset braking distance.

The configuration of the second controller 280 provided in the cruise control device will be described in detail below with reference to a flowchart.

The second controller 280 may be implemented as a single processor.

The second controller 280 may include a memory (not shown) for storing data regarding an algorithm for controlling the operations of the components of the first vehicle 1 or a program that represents the algorithm, and a processor (not shown) that performs the above-described operations using the data stored in the memory. In this case, the memory and the processor may be implemented as separate chips. Alternatively, the memory and the processor may be implemented as a single chip.

The storage 281 stores map information and road information.

The map information may include position information of a road, position information of buildings around a road, and the like. The road information may include information about the position of a street tree, around an intersection or a road in which a left, right, or U-turn is performable, position information of buildings around an intersection or a road in which a left, right, and U-turn is performable, loading information of construction materials, position information of banners, and the like.

The storage 281 may store information about the target travelling velocity.

The storage 281 may include a program and/or data for processing the radar data, a program and/or data for processing the radar data, and a program and/or data for generating a braking signal and/or a warning signal by the second controller 280.

The storage 281 may temporarily memorize image data received from the front camera 110 and/or radar data received from the radars 120 and 130, and temporarily memorize results of processing the image data and/or radar data.

The storage 281 may also store information about preset braking distances for each braking part of the braking system.

More specifically, the storage 281 may store information about the first braking distance of the pre-fill part, the second braking distance of the pre-braking part, and the third braking distance of the emergency braking part.

The storage 281 may store information about the type and volume of a sound corresponding to an alert of a collision risk.

The storage 281 may include a nonvolatile memory device, such as a cache, a read only memory (ROM), a programmable ROM (PROM), an erasable programmable ROM (EPROM), an electrically erasable programmable ROM (EEPROM), and a flash memory, a volatile memory device, such as a random-access memory (RAM), or other storage media, such as a hard disk drive (HDD), a CD-ROM, and the like, but the implementation of the storage 130 is not limited thereto.

The storage 281 may be a memory implemented as a chip separated from the processor, which has been described above in connection with the second controller 281, or may be implemented as a single chip integrated with the processor.

Figure 6:
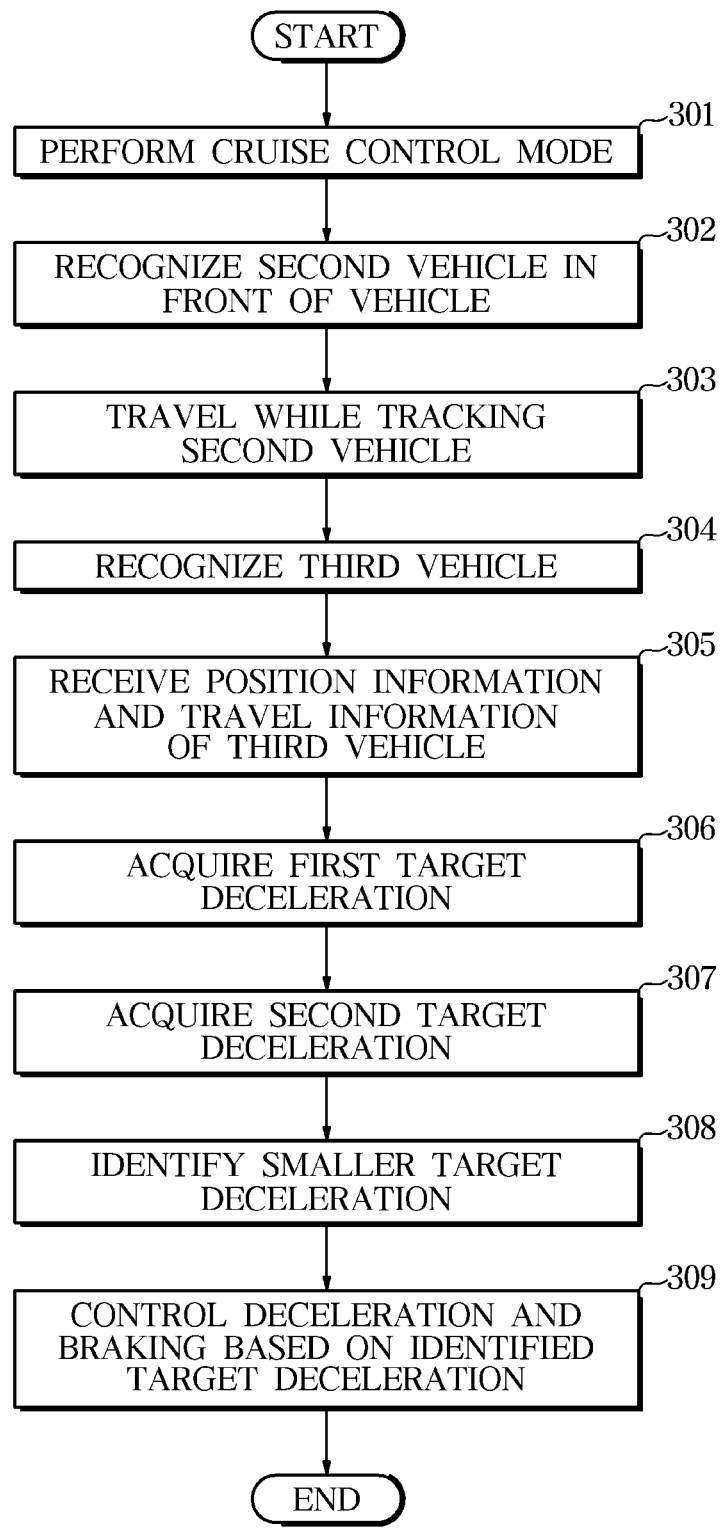
FIG. 6 is a control flowchart of a vehicle according to an embodiment, which shows a case in which the vehicle travels straight in a cruise control mode.

FIG. 6 is a control flowchart of a vehicle (the first vehicle, that is, the host vehicle) according to an embodiment, which shows a case in which the vehicle travels straight in a cruise control mode.

The vehicle may, upon receiving destination information through the inputter 210 during execution of a cruise control mode (301), search for a path from the current position to the destination based on current position information acquired by the position receiver and the destination information, match path information about the found path with map information to generate navigation information, and output a navigation image and path guidance information based on the generated navigation information.

The vehicle may search for a path based on road environment information received through the communicator in a navigation mode, and match path information about the found path with the map information.

The vehicle may acquire current position information based on position information received from the position receiver while travelling in the cruise control mode, and control output of navigation information according to travel based on the acquired current position information. Such a vehicle may acquire travelling path information about a travelling path of the vehicle based on navigation information when the navigation mode is performed.

The vehicle may acquire the travelling velocity of the vehicle based on the plurality of wheel velocities detected by the plurality of wheel velocity sensors, and may acquire the travelling velocity of the vehicle based on the acceleration detected by the acceleration sensor, and may acquire the actual travelling velocity information of the vehicle based on the plurality of wheel velocities detected by the plurality of wheel velocity sensors and the acceleration detected by the acceleration sensor.

The vehicle may, in the execution of the cruise control mode, control acceleration and deceleration based on target travelling velocity information and actual travelling velocity information, and may control deceleration or acceleration based on obstacle information detected by the obstacle detector 220. Here, the obstacle may be a second vehicle travelling in front of the first vehicle, which is the host vehicle, and may further include an obstacle existing on the road other than the second vehicle 2.

The vehicle may control output of collision risk information based on the obstacle information. Here, the collision risk information may or may not be output depending on whether a collision risk notification mode is selected by the user.

More specifically, the vehicle may recognize another vehicle travelling in the travelling path of the first vehicle based on the obstacle information detected by the obstacle detector 220. For example, the vehicle may recognize the second vehicle based on obstacle information detected by the front radar (302).

The vehicle may, in the execution of the cruise control mode, travel while tracking the second vehicle (303), by travelling while tracking the second vehicle based on obstacle information detected by the obstacle detector 220. Here, the travel of the vehicle while tracking the second vehicle represent travel while maintaining a constant distance to the second vehicle.

In this case, the vehicle may acquire relative distance information with respect to the second vehicle in front of the vehicle based on distance information with respect to the second vehicle.

In addition, the vehicle may recognize the second vehicle travelling in front of the vehicle based on image information acquired by the front camera, and may acquire relative distance information and relative velocity information with respect to the second vehicle recognized by the front camera based on obstacle information detected by the obstacle detector 220.

The vehicle may acquire the relative velocity information with respect to the second vehicle based on the acquired relative distance information with respect to the second vehicle and the travelling velocity information of the first vehicle. That is, the vehicle may identify a change in relative distance information with respect to the second vehicle over time, and acquire a relative velocity with respect to the second vehicle based on the changed relative distance information and the travelling velocity information of the first vehicle.

The vehicle may acquire a TTC with the second vehicle 2 based on the relative distance information and the relative velocity information of the second vehicle in front of the vehicle, and warn the driver of a collision or control braking based on a result of comparing the TTC with a predetermined reference time.

In response to the TTC being less than a predetermined first reference time, the vehicle may control output of collision risk information through at least one of the sound outputter and the display.

In response to the TTC being less than a predetermined second reference time, the vehicle may control braking. In this case, the second reference time is shorter than the first reference time.

That is, the vehicle may control at least one of the display and the sound outputter so that collision risk information is output if the TTC with the second vehicle is less than or equal to the first reference time and is greater than the second reference time, and may control braking for collision avoidance control if the TTC is less than or equal to the second reference time.

As another example, the vehicle may acquire a DTC with respect to the second vehicle in front of the vehicle based on the relative velocity information of the second vehicle, and warn the driver of a collision or control braking based on a result of comparing the DTC with a distance between the vehicle and the second vehicle.

That is, the vehicle may control at least one of the display and the sound outputter so that collision risk information is output if the distance to the second vehicle is a first reference distance, and may control braking for collision avoidance control if the distance to the second vehicle is a second reference distance to prevent a collision prevention. Here, the second reference distance may be shorter than the first reference distance. The first and second reference distances may be previously stored information.

The vehicle may, upon determining that a collision is not avoidable by braking, acquire the direction of the second vehicle, and output guide information about the heading direction of the first vehicle for collision avoidance based on the acquired direction of the second vehicle.

As described above, the vehicle may travel while tracking the second vehicle 2 during execution of the cruise control mode, and also travel while preventing a collision with the second vehicle.

The vehicle may, during execution of the cruise control mode, control braking based on travel information of another vehicle (e.g., the third vehicle) travelling within the travelling path of the first vehicle d.

More specifically, the vehicle receives road environment information and information about a plurality of other vehicles received by the communicator 250 while tracking the second vehicle.

The road environment information received through the communicator 250 may include information about an obstacle in a stationary state. Obstacles in a stationary state may include falling rocks, roadside trees, traffic lights, circuit breakers, and construction items.

The information about the other vehicles may include position information, travel information, and path information, and may further include identification information.

The road environment information received through the communicator 250 may be information transmitted from at least one of the infrastructure 4, the server 5, the second vehicle 2, and the third vehicle 3.

In addition, the vehicle may receive position information and travelling velocity information of the third vehicle from the second vehicle.

The vehicle may, upon receiving travel information of other vehicles through the communicator 250, recognize travel information of a vehicle except for the second vehicle among the other vehicles existing in the path of the first vehicle.

The vehicle may recognize other vehicles travelling on the same travelling path as the vehicle based on position information and path information of a plurality of other vehicles among the pieces of received information, and recognize a third vehicle travelling in front of the second vehicle among the recognized other vehicles (304).

The vehicle may acquire relative distance information and relative velocity information of the second vehicle based on obstacle information detected by the obstacle detector, and determines a first target deceleration based on the acquired relative distance information and relative velocity information of the second vehicle (306).

The vehicle acquires relative velocity information with respect to the third vehicle based on travel information of the third vehicle received through the communicator 250 and the actual travelling velocity information of the first vehicle, and acquire relative distance information with respect to the third vehicle based on position information of the first vehicle and position information of the third vehicle (305), and acquire a second target deceleration based on the acquired relative velocity information and relative distance information of the third vehicle (307).

The vehicle may control deceleration or braking based on the first target deceleration and the second target deceleration, by comparing the first target deceleration with the second target deceleration to identify a smaller target deceleration between the first target deceleration and the second target deceleration (308) and controlling braking based on the identified target deceleration (309). That is, the vehicle may control braking based on the first target deceleration if the first target deceleration is a smaller target deceleration between the first target deceleration and the second target deceleration, and control braking based on the second target deceleration if the second target deceleration is a smaller target deceleration.

Figure 7A:
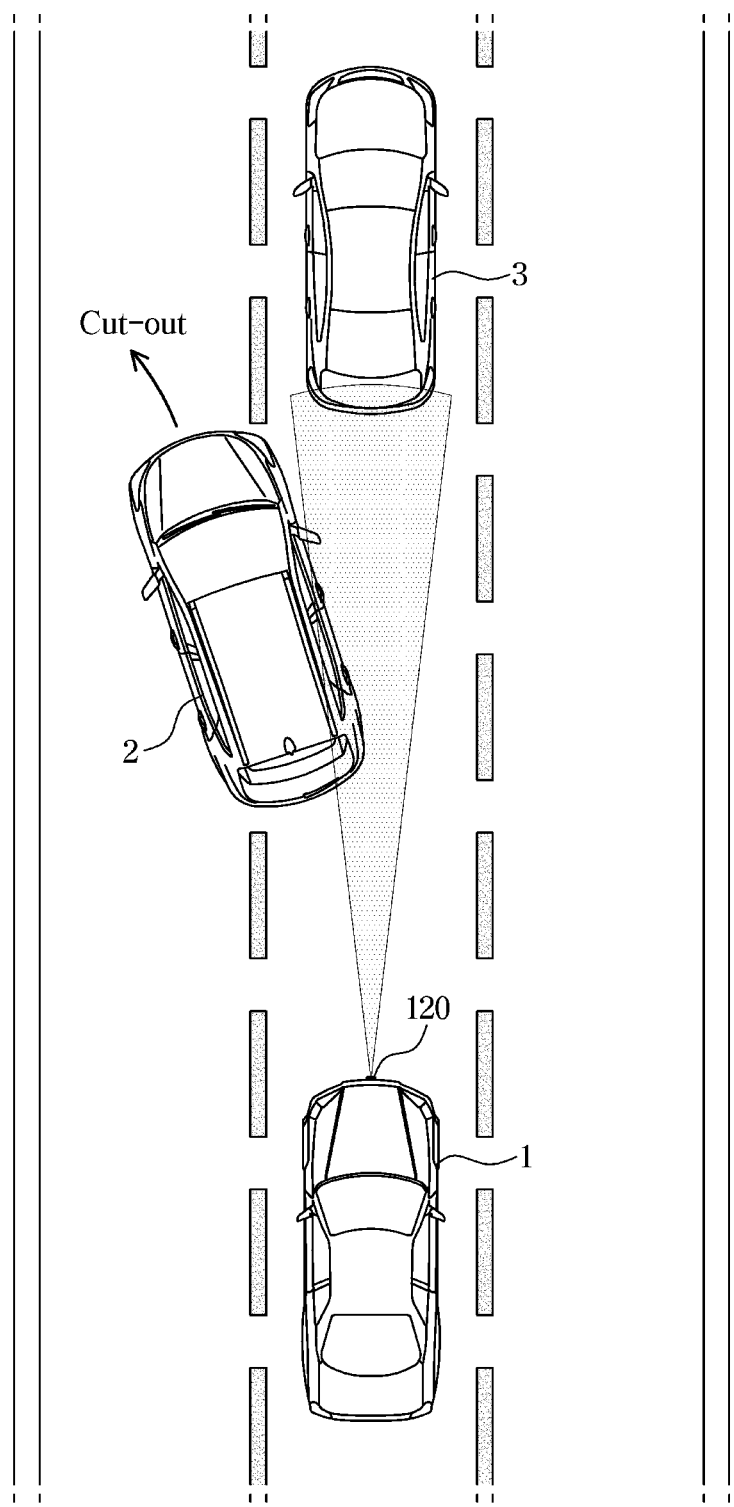
FIGS. 7A and 7B are diagrams of a road environment when a vehicle travels straight in a cruise control mode according to an embodiment.

Accordingly, as shown in FIG. 7A, the vehicle may, upon determining that the second vehicle 2 is not detected through the obstacle detector 220, determine that the path of the second vehicle 2 is suddenly changed (cut out).

The sudden path change may include a state in which the distance to the obstacle acquired based on obstacle information detected by the obstacle detector changes to a degree greater than or equal to a reference distance within a predetermined time.

In the conventional technology, when the second vehicle travelling in front of the vehicle changes the travelling lane during straight driving, a great difference between the actual travelling velocity of the current vehicle and the target travelling velocity may increase the acceleration value, which cause a collision with the third vehicle in front of the vehicle. Accordingly, the driver may have a great anxiety.

In addition, in the conventional technology, the first vehicle performs acceleration when the travelling path of the second vehicle is changed, in which case, the driver has a difficulty in performing braking in response to a third vehicle in front of the second vehicle. In this case, cruise control is deactivated and when the travel becomes safe, the driver needs to reset the cruise control mode, which causes a hassle to the driver.

However, according to the disclosure, the vehicle decelerates or performs braking based on the travel information of the third vehicle, so that the vehicle may travel stably even if the second vehicle travelling in front of the vehicle changes the travelling path, and the driver may be provided with psychological stability.

According to the disclosure, the vehicle decelerates and performs braking while maintaining the cruise control mode based on the travel information of the third vehicle in front of the vehicle during execution of the cruise control mode, so that the cruise control mode is prevented from being deactivated, thereby eliminating a hassle of the driver in resetting the cruise control mode.

As described above, even when the first vehicle 1 controls acceleration because the second vehicle 2 travelling in front of the first vehicle departs from the front of the first vehicle 1, the first vehicle 1 obtains the amount of acceleration in consideration of the travel information of the third vehicle 3 travelling in front of the second vehicle 2, so that the first vehicle 1 is prevented from colliding with the third vehicle 3.

The vehicle may, upon determining an absence of a third vehicle travelling in front of the second vehicle, acquire relative distance information and relative velocity information of the second vehicle based on obstacle information detected by the obstacle detector, and acquire a first target deceleration based on the acquired relative distance information and relative velocity information, and control deceleration and braking based on the acquired first target deceleration.

Absence of a third vehicle includes no vehicle that travels within a set distance to the second vehicle.

The vehicle may acquire the relative distance information and the relative velocity information of the second vehicle by acquiring travel information and position information of the second vehicle received by the communicator 250 during execution of the cruise control mode.

The vehicle may determine whether there is an obstacle that is stopped in the travelling path of the first vehicle based on road environment information received from the communicator 250, acquire relative distance information of the obstacle based on position information of the obstacle in the stationary state and position information of the first vehicle, acquire relative velocity information of the obstacle based on travelling velocity information of the first vehicle, and adjust the target deceleration based on the relative distance information and the relative velocity information of the obstacle.

The vehicle may acquire position information (direction) of an obstacle in front of the vehicle 1 and type information (for example, whether the obstacle is another vehicle, a pedestrian, a cyclist, a cub, a guard rail, a roadside tree, a street lamp, or the like) of the obstacle based on front image data of the front camera.

The vehicle may also determine whether the third vehicle is in a stationary state from the travel information and position information of the third vehicle received by the communicator 250.

Figure 7B:
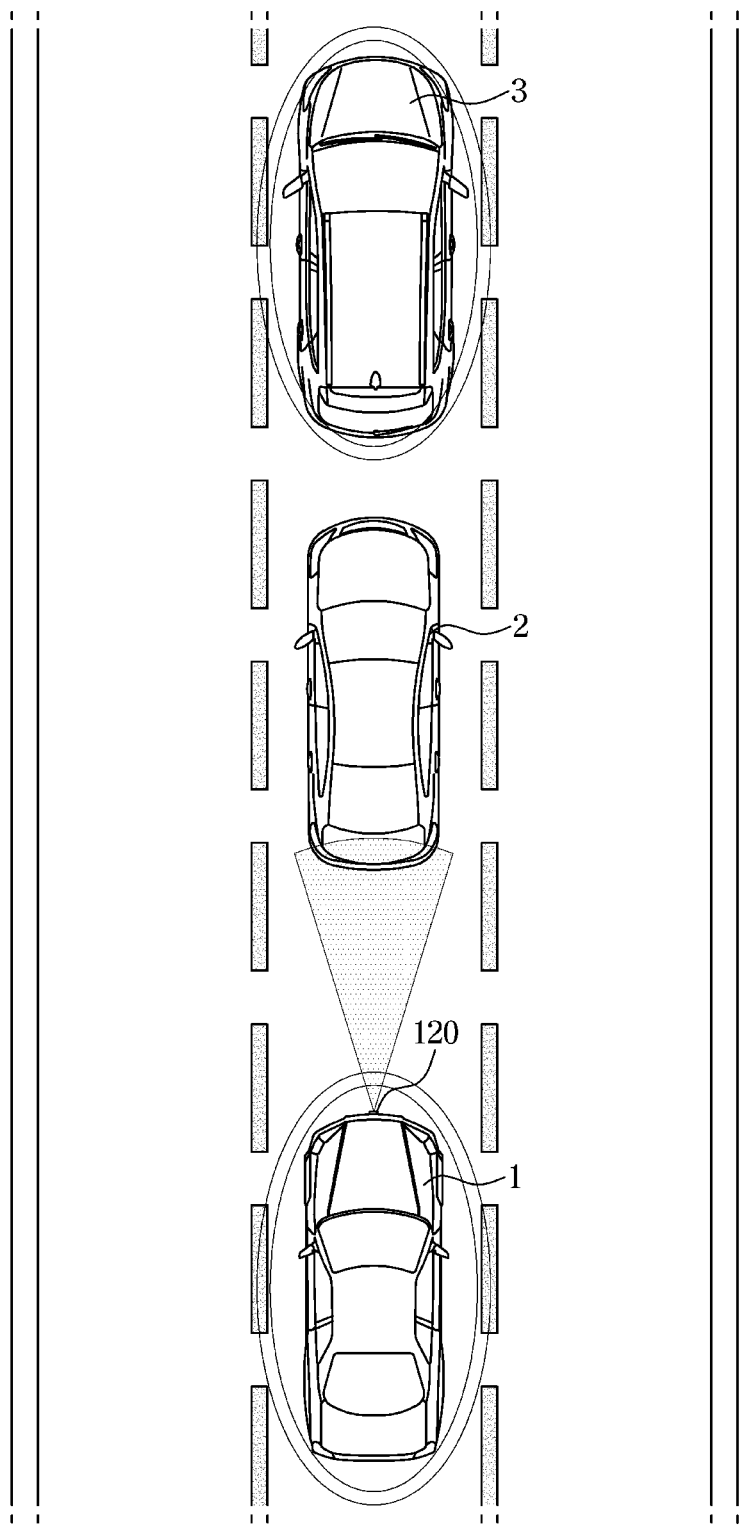

As shown in FIG. 7B, the vehicle may determine whether there is an obstacle that is stopped in the travelling path, and upon determining that there is an obstacle that is stopped in the path, acquire a target deceleration based on position information of the obstacle in the stationary state and the travelling velocity information of the first vehicle, and control deceleration and braking based on the acquired target deceleration.

As described above, even if the second vehicle 2 suddenly brakes due to a third vehicle in a stationary state in the travel path, since the first vehicle 1 performs deceleration and braking in consideration of the travel information of the third vehicle 3 travelling in front of the second vehicle 2, a collision with the second vehicle 2 may be prevented.

Figure 8:
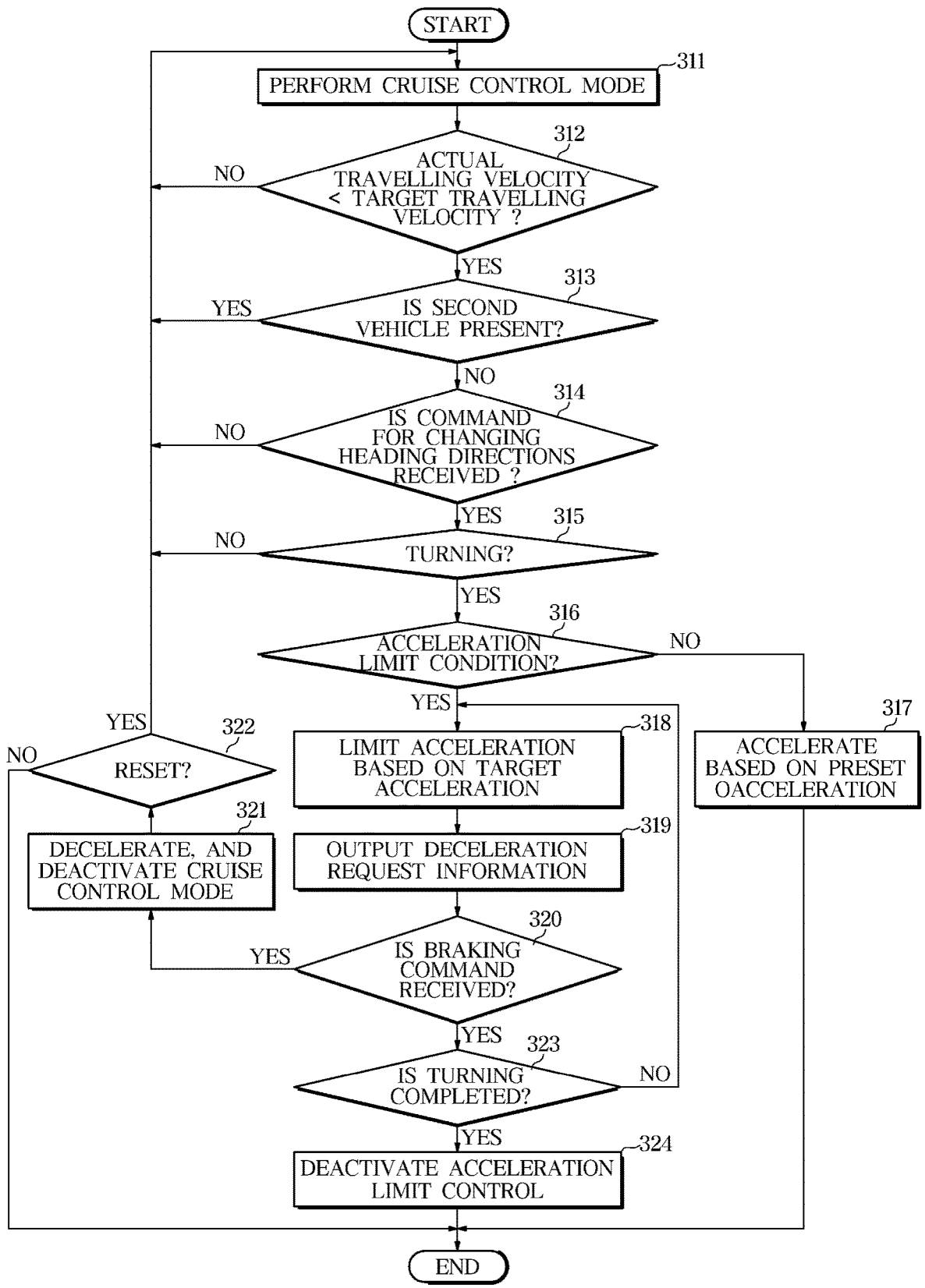
FIG. 8 is a control flowchart of a vehicle according to an embodiment, which shows a case in which the vehicle makes a turn in a cruise control mode.

FIG. 8 is a control flowchart of a vehicle according to an embodiment, which shows a case in which the vehicle makes a turn in a cruise control mode.

The vehicle may, upon receiving destination information through the inputter 210 during execution of a cruise control mode (301), search for a path from the current position to the destination based on current position information acquired by the position receiver and the destination information, match path information about the found path with map information to generate navigation information, and output a navigation image and path guidance information based on the generated navigation information.

The vehicle may acquire current position information based on position information received from the position receiver, and control output of navigation information according to travel based on the acquired current position information.

The vehicle may, in execution of a navigation mode, acquire travelling path information about a travelling path of the vehicle based on the navigation information.

The vehicle may acquire the actual travelling velocity of the vehicle based on the plurality of wheel velocities detected by the plurality of wheel velocity sensors, and may acquire the actual travelling velocity of the vehicle based on the acceleration detected by the acceleration sensor, and may acquire the actual travelling velocity information of the vehicle based on the plurality of wheel velocities detected by the plurality of wheel velocity sensors and the acceleration detected by the acceleration sensor.

The vehicle may, in execution of the cruise control mode, perform travel while controlling acceleration and deceleration such that the actual travelling velocity reaches the target travelling velocity based on the target travelling velocity and the actual travelling velocity.

The vehicle may control deceleration or acceleration based on obstacle information detected by the obstacle detector 220. That is, the vehicle determines whether a second vehicle travelling in the front of the vehicle is present based on the obstacle information detected by the obstacle detector 220, and upon determining that there is no second vehicle, controls the vehicle to travel at the target travelling velocity, and upon determining that a second vehicle is present, travels while tracking the second vehicle.

In this case, the vehicle acquires relative distance information with respect to the second vehicle based on obstacle information detected by the obstacle detector, and performs travel while adjusting the travelling velocity based on the acquired relative distance information of the second vehicle and the actual travelling velocity information of the first vehicle.

The vehicle determines whether a command for changing heading directions is received during execution of the cruise control mode (311). In this case, before determining whether a command for changing heading directions is received, the vehicle determines whether the actual travelling velocity is less than or equal to the target travelling velocity (312), and determines whether a second vehicle is present in front of the first vehicle in the travelling path of the first vehicle (313).

In addition, upon determining that the actual travelling velocity exceeds the target travelling velocity, the vehicle may determine that the possibility of changing heading directions is low.

Upon determining that a second vehicle is present on the travelling path of the first vehicle, the vehicle may determine that the possibility of controlling an acceleration limit is not needed because the vehicle travels while tracking the second vehicle.

That is, upon determining that the actual travelling velocity is less than or equal to the target travelling velocity and the second vehicle does not exist, the vehicle may determine whether a command for changing heading directions is received (314).

The vehicle may determine whether the heading direction is changed by determining whether the current position of the vehicle is an intersection based on path information of navigation information and current position information.

The vehicle, which is not in a navigation mode, may determine whether the heading direction is changed, based on at least one of steering angle information detected by the steering angle detector 233 and yaw rate information detected by the yaw rate detector 232 while travelling. Here, the change in the heading direction may include a lane change.

In addition, the vehicle may determine whether the heading direction is changed based on a lever signal input to the lever signal receiver 240. In this case, the vehicle may determine the intention of the driver to make a turn. That is, the vehicle determines whether the driving intention of the driver is a right turn intention or a left turn intention.

The vehicle may, upon receiving a lever signal corresponding to a left turn from the lever signal receiver 240, control the left turn indicating lamp at an on state, and upon receiving a lever signal corresponding to a right turn, control the right turn indicating lamp at an on state. In addition, the vehicle may, upon receiving a lever signal corresponding to turn-off of the turn signal lamp from the lever signal receiver 240, control the left turn indicating lamp and the right turn indicating lamp at an off state.

In this case, the vehicle may determine whether the heading direction is changed by checking the on/off states of the left turn indicating lamp and the right turn indicating lamp.

In addition, the vehicle may, upon determining that the left turn indicating lamp and the right turn indicating lamp are at an on state, recognize the state as a command for turning on an emergency light rather than a command to change heading directions.

The vehicle may, in response to determining that an intention of a driver corresponds a command for changing heading directions, determine whether the first vehicle is turning (315), and upon determining that the first vehicle is turning, determine whether an acceleration limit condition is satisfied (316).

Figure 9:
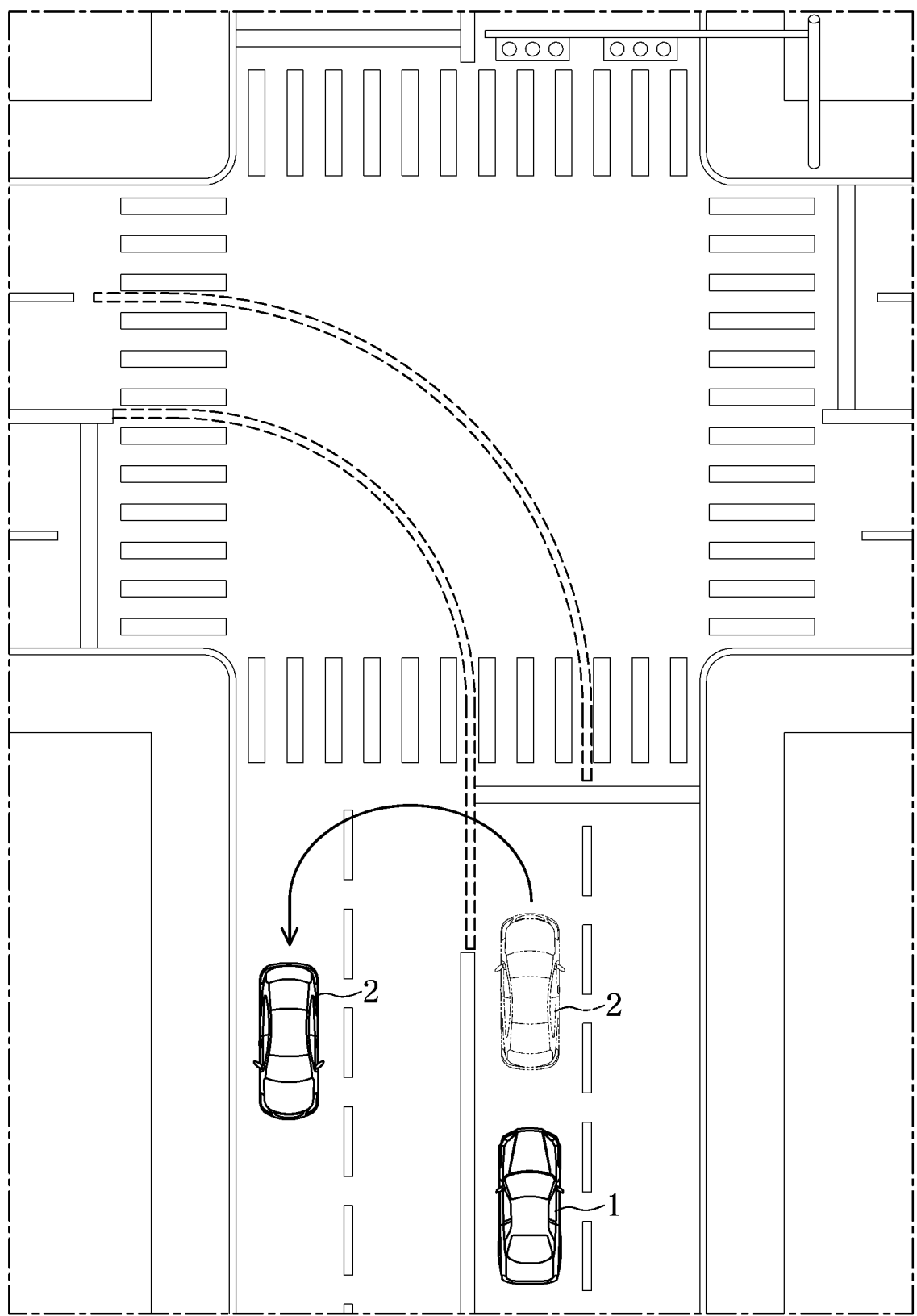
FIG. 9 is a diagram illustrating an example of a road environment when a vehicle makes a turn in a cruise control mode according to an embodiment.

As shown in FIG. 9, the vehicle may, upon determining that a second vehicle is present in front of the vehicle, determine whether the travelling path of the second vehicle is changed while making a turn, and upon determining that the travelling path of the second vehicle is changed, terminate tracking the second vehicle and determine whether an acceleration limit condition is satisfied.

The determining whether the vehicle is turning includes determining whether a change in the yaw rate value detected by the yaw rate detector has occurred.

The determining whether the vehicle is turning includes determining whether a change in the differential value of the yaw rate value detected by the yaw rate detector has occurred.

Figure 10:
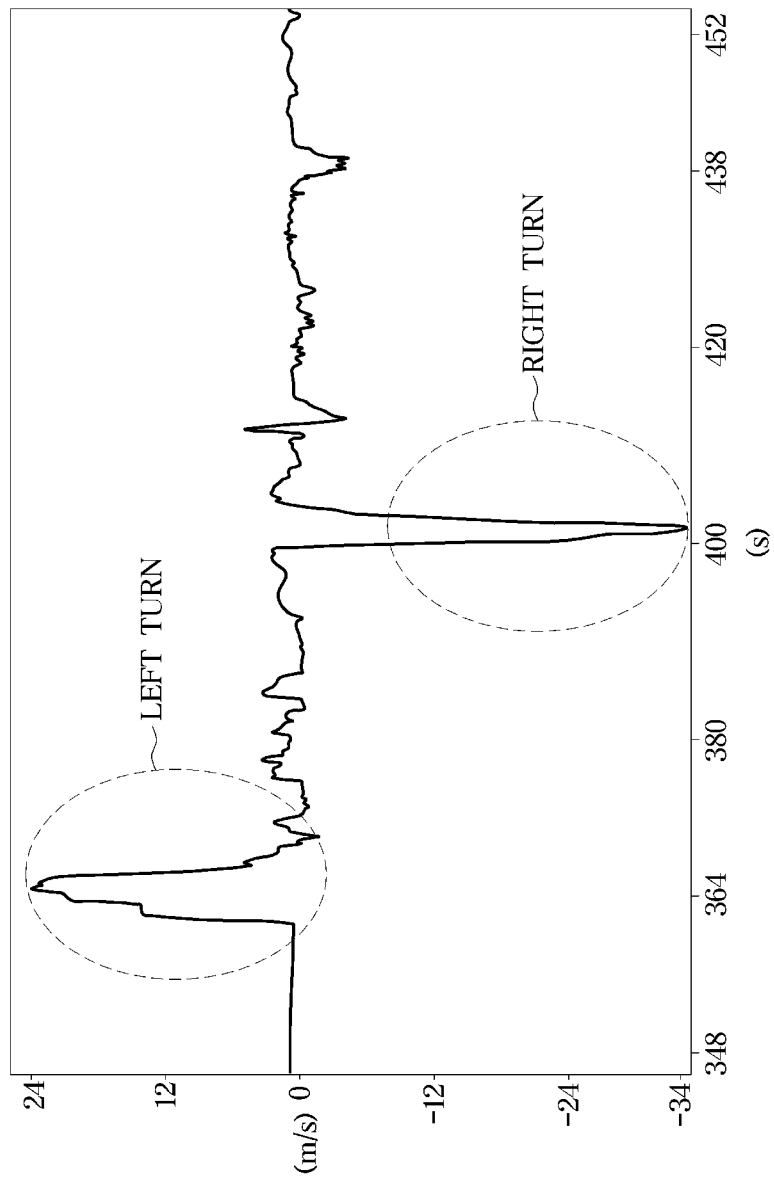
FIG. 10 is an output graph of a yaw rate when a vehicle makes a turn in a cruise control mode according to an embodiment.

As shown in FIG. 10, the vehicle, during a left-turn, outputs a yaw rate value that is a positive value, and during a right-turn, outputs a yaw rate value that is a negative value.

That is, the vehicle may, if the yaw rate value output through the yaw rate detector is a positive value, determine that the vehicle is making a left turn, and if the yaw rate value is a negative value, determine that the vehicle is making a right turn.

The vehicle may, if the differential value of the detected yaw rate value is changed from a positive value to a negative value, determine that the vehicle is making a left turn, and if the differential value of the detected yaw rate value is changed from a negative value to a positive value, determine that the vehicle is making a right-turn.

The determining whether the acceleration limit condition is satisfied includes determining whether the yaw rate value detected by the yaw rate detector is greater than or equal to a reference yaw rate value.

The determining whether the acceleration limit condition is satisfied includes acquiring a yaw acceleration value by differentiating the detected yaw rate value, and determining whether the acquired yaw acceleration value is greater than or equal to a reference yaw acceleration value.

In this case, the absolute value of the yaw rate may be compared with the reference yaw rate value, and the absolute value of the acquired yaw acceleration value may be compared with the reference yaw acceleration value.

The reference yaw rate value may include a first offset value based on a turning parameter.

The reference yaw acceleration value may include a second offset value based on a turning parameter.

The first offset value and the second offset value may be values acquired and stored through an experiment.

The determining whether the acceleration limit condition is satisfied includes comparing actual travelling velocity information of the vehicle with reference travelling velocity information. Here, the reference travelling velocity may include a first reference travelling velocity and a second reference travelling velocity that is faster than the first reference travelling velocity. That is, determining whether the vehicle is turning includes determining whether the actual travelling velocity of the vehicle is greater than the first reference travelling velocity and is less than the second reference travelling velocity.

That is, the vehicle may determine that the acceleration limit condition is satisfied in response to the detected yaw rate value being greater than or equal to the reference yaw rate value, the acquired yaw acceleration value being greater than or equal to the reference yaw acceleration value, and the actual travelling velocity of the vehicle being greater than the first reference travelling velocity and being less than the second reference travelling velocity.

That is, the vehicle may, upon determined that the acceleration limit condition is not satisfied, control acceleration based on a preset acceleration (317). Here, the preset acceleration may be an acceleration at which the vehicle is controlled during turning in a cruise control mode.

The vehicle may, upon determining that t the acceleration limit condition is satisfied, perform acceleration limit control based on a target acceleration (318). Here, the target acceleration may be approximately 0 m/s2.

The vehicle may, in the performing of the acceleration limit control, output deceleration request information for requesting deceleration to the user (319). In this case, the deceleration request information may be output through at least one of the display, the cluster, and the sound outputter.

The vehicle may determine whether a braking command is received during turning (320). That is, the vehicle may determine whether the brake pedal is pressed by the driver by determining whether a pressure is detected through the pressure detector.

The vehicle may, upon determining that a braking command is received during turning, control deceleration and deactivate the cruise control mode (321).

The vehicle performs a manual driving mode until the cruise control mode is reset by the user, and when the cruise control mode is reset (322) during the manual driving mode, performs the cruise control mode.

The vehicle determines whether the turning is completed based on the yaw rate information during execution of the cruise control mode (323), and upon determining that the turning is completed, deactivate the acceleration limit control (324). Thereafter, the vehicle continues to travel in the cruise control mode.

If acceleration is restricted when the first vehicle is turning at a low velocity, traffic flow may be obstructed and the driver may feel bored. Conversely, if deceleration is limited when the first vehicle is turning at a high velocity, the possibility of an accidence may increase.

When the driver enters a left or right turn depending on the cruise control mode, the driver is allowed to decelerate so that safe driving may be performed.

In the conventional technology, when a first vehicle attempts a left or right turn at an intersection, a second vehicle in front of the vehicle may disappear, and that may cause the first vehicle to accelerate, increasing the driver's anxiety. In addition, in the conventional technology, if the difference between the actual travelling velocity of the current vehicle and the target travelling velocity is great, the acceleration value is increased, which therefore increases the risk of a frontal collision.

According to the disclosure, acceleration of the vehicle is limited in a situation described above, thereby providing the driver with a psychological stability and reducing the possibility of collision with the vehicle in front.

In the conventional technology, when a vehicle performs acceleration during turning, a presence of another vehicle in front of the vehicle causes the driver to decelerate the vehicle, so that cruise control is deactivated and at a later time, the driver needs to reset the cruise control mode.

However, according to the disclosure, acceleration is automatically limited in response to a change in the heading direction of another vehicle in front of the vehicle during cruise control, so that the user inconvenience according to the limitation of resetting the cruise control mode may be improved.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

As is apparent from the above, the advanced driver assistance system (ADAS) according to the disclosure and the vehicle having the same can limit acceleration if another nearby vehicle (a second vehicle) change the travelling path in a situation of left turn, right turn, or U-turn during cruise control of a host vehicle (a first vehicle), thereby providing the driver with psychological stability and reducing collisions with another nearby vehicle (a third vehicle). In such a situation, unrequired deactivation of a cruise control mode can be prevented and a hassle of resetting of the cruise control mode after deactivation can be eliminated, thereby improving the driver's convenience.

In addition, the advanced driver assistance system (ADAS) according to the disclosure and the vehicle having the same can request a driver to brake in a situation of left turn, right turn, or U-turn during a cruise control mode such that the driver directly decelerates if the host vehicle performs acceleration control in response to a change in the travelling path of another nearby vehicle (a second vehicle).

The advanced driver assistance system (ADAS) according to the disclosure and the vehicle having the same can check whether a travelling state of a third vehicle travelling in front of a second vehicle is in a low-speed travelling state or a stopped state during a cruise control mode and thus can prevent a collision with the second vehicle or the third vehicle even in a sudden braking of the nearby second vehicle.

The advanced driver assistance system (ADAS) according to the disclosure and the vehicle having the same can control deceleration based on a required deceleration for another nearby vehicle (i.e., a third vehicle) before another nearby vehicle changes a travelling path during a cruise control mode, thereby preventing a collision with the other nearby vehicle (the third vehicle). Accordingly, safety travel can be secured even if the driver is negligent in keeping an eye on the surroundings.

The advanced driver assistance system (ADAS) according to the disclosure and the vehicle having the same can improve the overall traffic congestion situation in the future by maximizing the use of information about another nearby vehicle (a third vehicle).

The advanced driver assistance system (ADAS) according to the disclosure and the vehicle having the same can perform control of braking according to the possibility of collision with other nearby vehicles (second and third vehicles) while no hardware configuration is added, thereby preventing an increase in the cost of the vehicle and improving the stability of the vehicle.

The advanced driver assistance system (ADAS) according to the disclosure and the vehicle having the same can have an improved quality and marketability, increase user satisfaction and secure product competitiveness.

Although embodiments of the present disclosure have been described for illustrative purposes, those skilled in the art will appreciate that various modifications, additions and substitutions are possible, without departing from the scope and spirit of the disclosure. Therefore, embodiments of the present disclosure have not been described for limiting purposes.

What is claimed is:

1. An advanced driver assist system (ADAS) for performing cruise control in a first vehicle, the ADAS comprising:
a communicator configured to communicate with a plurality of other vehicles;
an obstacle detector configured to detect an obstacle among obstacles in a surrounding and output obstacle information about the detected obstacle;
a controller configured to:
acquire distance information about a distance to a second vehicle travelling in the surrounding of the first vehicle among the obstacles based on the obstacle information detected by the obstacle detector during a cruise control mode,
acquire travel information and position information of a third vehicle travelling in a surrounding of the second vehicle based on information received through the communicator, and
control acceleration and deceleration of the first vehicle based on the distance information with respect to the second vehicle, the travel information of the third vehicle, and the position information of the third vehicle; and
a velocity detector configured to detect a travelling velocity of the first vehicle and output travelling velocity information of the first vehicle about the detected travelling velocity,
wherein the controller is configured to:
acquire a first target deceleration based on a current position information of the first vehicle, the travelling velocity information of the first vehicle, and the distance information with respect to the second vehicle,
acquire a second target deceleration based on the current position information of the first vehicle, the travelling velocity information of the first vehicle, the travel information of the third vehicle, and the position information of the third vehicle, and
control the deceleration of the first vehicle based on the first target deceleration and the second target deceleration.

2. The ADAS of claim 1, wherein the controller is configured to:

determine whether the second vehicle has departed from a travelling path based on the obstacle information detected by the obstacle detector; and upon determining that the second vehicle has departed from the travelling path, control acceleration and deceleration of the first vehicle based on the travel information of the third vehicle.

3. The ADAS of claim 1, wherein the controller is configured to, in response to the third vehicle existing in the surrounding of the second vehicle, control the deceleration of the first vehicle at a smaller target deceleration between the first target deceleration and the second target deceleration.

4. The ADAS of claim 1,
wherein
the communicator is configured to receive the current position information of the first vehicle, and
the controller is configured to:
acquire position information of an obstacle that is stopped in a travelling path based on road environment information received through the communicator, and
control the deceleration of the first vehicle based on the acquired position information of the obstacle, the current position information of the first vehicle, and the travelling velocity information of the first vehicle.

5. An advanced driver assist system (ADAS) for performing cruise control in a first vehicle, the ADAS comprising:
an obstacle detector configured to detect an obstacle in a surrounding and output obstacle information about the detected obstacle;
a velocity detector configured to detect a travelling velocity of the first vehicle and output actual travelling velocity information about the detected travelling velocity;
a yaw rate detector configured to detect a yaw rate of the first vehicle and output yaw rate information about the detected yaw rate; and
a controller configured to:
determine whether the first vehicle is turning based on the detected yaw rate information during a cruise control mode,
upon determining that the first vehicle is turning, determine whether an obstacle exists in a surrounding based on the obstacle information,
upon determining that there is no obstacle in the surrounding, acquire a yaw rate value and a yaw acceleration value based on the yaw rate information, and
control acceleration limit based on the acquired yaw rate value, the yaw acceleration value, and the actual travelling velocity information,
wherein the controller is further configured to:
determine whether an acceleration limit condition is satisfied based on the acquired yaw rate value, the yaw acceleration value, and the actual travelling velocity information,
upon determining that the acceleration limit condition is satisfied, control acceleration of the first vehicle based on a target acceleration, and
upon determining that the acceleration limit condition is not satisfied, control the acceleration of the first vehicle based on a preset acceleration.

6. The ADAS of claim 5, wherein the acceleration limit condition includes a condition in which the acquired yaw rate value is greater than or equal to a reference yaw rate value, the yaw acceleration value is greater than or equal to a reference yaw acceleration value, and the travelling velocity of the first vehicle is greater than a first reference travelling velocity and less than a second reference travelling velocity.

7. The ADAS of claim 5, further comprising a steering angle detector configured to detect a steering angle of the first vehicle and output steering angle information about the detected steering angle,
wherein the controller is configured to determine whether the first vehicle is turning based on the detected steering angle information.

8. The ADAS of claim 5, further comprising a lever signal receiver configured to receive a lever signal of a heading direction indicating lever,
wherein the controller is configured to upon determining that an actual travelling velocity of the first vehicle is less than or equal to a target travelling velocity, a second vehicle does not exist in the surrounding of the first vehicle, and a turning drive command is received through the lever signal receiver, determine an acceleration limit condition.

9. The ADAS of claim 5, wherein the controller is configured to upon determining that an actual travelling velocity of the first vehicle is less than or equal to a target travelling velocity, another vehicle does not exist in the surrounding of the first vehicle, and a heading direction indicating lamp is turned on, determine an acceleration limit condition.

10. The ADAS of claim 5, wherein the controller is configured to, upon determining two heading direction indicating lamps are turned on, determine an emergency lamp is turned on.

11. The ADAS of claim 5, wherein the controller is configured to, when controlling the acceleration limit, control at least one of a display, a cluster, and a sound outputter to output deceleration request information.

12. The ADAS of claim 5, wherein the controller is configured to control deactivation of a cruise control mode in response to receiving pressure information corresponding to a pressure applied to a brake pedal.

13. A vehicle comprising:
a communicator configured to communicate with a plurality of other vehicle and receiving current position information;
an obstacle detector configured to detect an obstacle among obstacles in a surrounding and output obstacle information about the detected obstacle; and
a velocity detector configured to detect a travelling velocity and output actual travelling velocity information about the detected travelling velocity, and
a controller configured to:
acquire distance information about a distance to another vehicle travelling in a surrounding of the vehicle within a travelling path among the obstacles based on the obstacle information detected by the obstacle detector during a cruise control mode;
acquire travel information and position information of another vehicle travelling in a surrounding of the another vehicle based on information received through the communicator; and
control acceleration and deceleration of the first vehicle based on the current position information of the vehicle, the distance information with respect to the another vehicle, and the travel information and the position information of the another vehicle that travels in the surrounding of the another vehicle, wherein the controller is further configured to:
acquire a first target deceleration based on the current position information, the travelling velocity information of the another vehicle, and the distance information with respect to the another vehicle,
acquire a second target deceleration based on the current position information, the actual travelling velocity information, and the travel information and the position information of the another vehicle that travels in the surrounding of the another vehicle, and
control the deceleration of the first vehicle at a smaller target deceleration between the first target deceleration and the second target deceleration.

14. The vehicle of claim 13, further comprising a yaw rate detector configured to detect a yaw rate and output yaw rate information about the detected yaw rate,
wherein the controller is configured to:
determine whether the vehicle is turning based on the detected yaw rate information,
upon determining that the vehicle is turning, acquire a yaw rate value and a yaw acceleration value based on the yaw rate information, and
control acceleration limit based on the acquired yaw rate value, the yaw acceleration value, and the actual travelling velocity information.

15. The vehicle of claim 14, wherein the controller is configured to:
determine whether an acceleration limit condition is satisfied based on the acquired yaw rate value, the yaw acceleration value, and the actual travelling velocity information;
upon determining that the acceleration limit condition is satisfied, control acceleration based on a target acceleration; and
upon determining that the acceleration limit condition is not satisfied, control acceleration based on a preset acceleration.

16. The vehicle of claim 15, wherein the acceleration limit condition includes
a condition in which the acquired yaw rate value is greater than or equal to a reference yaw rate value, the yaw acceleration value is greater than or equal to a reference yaw acceleration value, and the travelling velocity of the vehicle is greater than a first reference travelling velocity and less than a second reference travelling velocity.

17. The vehicle of claim 14, further comprising a lever signal receiver configured to receive a lever signal of a heading direction indicating lever,
wherein the controller is configured to
upon determining that the actual travelling velocity of the vehicle is less than or equal to a target travelling velocity, the another vehicle does not exist, and a turning drive command is received through the lever signal receiver, determine an acceleration limit condition.

18. The vehicle of claim 14, wherein the controller is configured to, when controlling the acceleration limit, control at least one of a display, a cluster, and a sound outputter to output deceleration request information.

* * * * *